United States Patent [19]
Brant et al.

[11] Patent Number: 5,475,075
[45] Date of Patent: Dec. 12, 1995

[54] ETHYLENE/LONGER α-OLEFIN COPOLYMERS

[75] Inventors: Patrick Brant; Jo Ann M. Canich, both of Seabrook, Tex.

[73] Assignee: Exxon Chemical Patents Inc., Wilmington, Del.

[21] Appl. No.: 393,520

[22] Filed: Feb. 23, 1995

Related U.S. Application Data

[63] Continuation of Ser. No. 294,777, Aug. 23, 1994, abandoned, which is a continuation of Ser. No. 78,952, Jun. 16, 1993, abandoned, which is a continuation of Ser. No. 806,894, Dec. 13, 1991, abandoned.

[51] Int. Cl.$^6$ .......................... C08F 10/14; C08F 210/14
[52] U.S. Cl. .................. 526/348.3; 526/160; 526/348.1
[58] Field of Search ................................ 526/160, 348.1, 526/348.3

[56] References Cited

U.S. PATENT DOCUMENTS

| | | | |
|---|---|---|---|
| 4,668,752 | 5/1987 | Tominari et al. | 526/348.3 |
| 4,752,597 | 6/1988 | Turner | 526/160 |
| 4,830,907 | 5/1989 | Sawyer et al. | 428/225 |
| 4,842,922 | 6/1989 | Krupp et al. | 428/198 |
| 4,880,691 | 11/1989 | Sawyer et al. | 428/225 |
| 4,897,455 | 1/1990 | Welborn, Jr. | 526/160 |
| 4,923,833 | 5/1990 | Kioka et al. | 526/160 |
| 5,023,388 | 6/1991 | Lüker | 585/9 |
| 5,055,438 | 10/1991 | Canich | 502/117 |
| 5,096,867 | 3/1992 | Canich | 526/160 |
| 5,272,236 | 12/1993 | Lai et al. | 526/348.5 |
| 5,378,778 | 1/1995 | Johoji et al. | 526/142 |

FOREIGN PATENT DOCUMENTS

| | | |
|---|---|---|
| 69951 | 1/1983 | European Pat. Off. . |
| 161060 | 11/1985 | European Pat. Off. . |
| 223394 | 5/1987 | European Pat. Off. . |
| 328753 | 6/1989 | European Pat. Off. . |
| 349886 | 1/1990 | European Pat. Off. . |
| 395075 | 10/1990 | European Pat. Off. . |
| 0416815A2 | 3/1991 | European Pat. Off. . |
| 418044 | 3/1991 | European Pat. Off. . |
| 420436 | 4/1991 | European Pat. Off. . |
| 436520 | 7/1991 | European Pat. Off. . |
| 436399 | 7/1991 | European Pat. Off. . |
| 440505 | 8/1991 | European Pat. Off. . |
| 440504 | 8/1991 | European Pat. Off. . |
| 0495099 | 7/1992 | European Pat. Off. . |
| 13246 | 4/1982 | Japan . |
| 63-057615 | 8/1986 | Japan . |
| 63-039905 | 8/1986 | Japan . |
| 106907 | 5/1991 | Japan . |
| 8500172 | 1/1985 | WIPO . |
| 90/07526 | 7/1990 | WIPO . |
| 9007526 | 7/1990 | WIPO . |
| 93/08221 | 4/1993 | WIPO . |

OTHER PUBLICATIONS

Journal of Polymer Science Pt. B: Pol. Physics Ed. vol. 26 p. 1271 (1988).
Journal of Pol. Sci. B: Polymer Physic Ed. 25, 1057 (1987).
Journal of Pol. Sci. A: vol. 1 p. 751 (1963).
Burfield, Macromolecules vol. 20 p. 3020 (1987).
Soga, Makrolmol. Chem. 190, 2683 (1989).
Journal of Polymer Science B: Pol Phys Ed. 28 1917 (1990).
Ross, Pure Applied Chem. A29, p. 65 (1992).
Proceedings of Int'l Course on Interfaces Bet. Math., Chem. & Comp. Sci. in Durbegnek, Yugoslavia, Jun. 22–26, 1987. R. C. Lateher, ed. Studies in Phys. & Theor. Chem. 54, 202; 87.
Plastics News Jan. 20, 1992 "Dow, Exxon Pursue Catalyst Technology" p. 4.
Shirayama, Die Makrol. Chemie 151, 98 (1972).
Polymer Communications (Preprint) J. Koivumäki and J. V. Seppälä, "Copolymerization of Ethylene and I–Hexadecene with $Cp_2ZrCl_2$–Methylaluminoxane Catalyst".
"Olefin Polymerization Catalyst Debuts," Chemistry & Engineering News, Dec. 23, 1991, p. 16.

*Primary Examiner*—David W. Wu
*Attorney, Agent, or Firm*—Tom F. Pruitt; Myron B. Kurtzman; Catherine L. Bell

[57] ABSTRACT

High molecular weight linear copolymers of ethylene and 1–50 mole percent linear α-olefins having from 10 to 100 carbon atoms are disclosed. The polymers have $M_w$ of 30,000–1,000,000, MWD of 2–4, a density of 0.85–0.95 g/cm³, and a high composition distribution breadth index. Also disclosed are a method for making the polymers with a cyclopentadienyl metallocene catalyst system, and adhesives, films, molded articles and other products made from the copolymers.

12 Claims, 10 Drawing Sheets

ETHYLENE/LONGER α-OLEFIN COPOLYMERS

This is a continuation of application Ser. No. 08/294,777, filed Aug. 23, 1994, now abandoned, which is a R. 62 continuation of 08/078,952, filed Jun. 16, 1993, now abandoned, which is a R. 62 continuation of 07/806,894 filed Dec. 13, 1991, now abandoned.

FIELD OF THE INVENTION

This invention relates to copolymers of ethylene and longer α-olefins. More particularly, this invention relates to high molecular weight ethylene copolymers of α-olefins having from 10 to 100 carbon atoms. This invention also relates to a process for copolymerizing ethylene with longer α-olefins utilizing certain transition metal compounds from Group IV B of the Periodic Table of Elements that produces high molecular weight copolymers.

BACKGROUND OF THE INVENTION

Prior art copolymers of ethylene and longer α-olefins, i.e. olefins having about 10 or more carbon atoms, have suffered a number of disadvantages. Primarily, it has not been possible to prepare such copolymers, having sufficiently high molecular weight for most applications, using a traditional Ziegler-Natta catalyst. Generally, as the longer α-olefin comonomer content increases, the molecular weight decreases significantly. Also, the ethylene copolymers have had a very broad molecular weight distribution, as well as a broad α-olefin composition distribution. This arises from the prior art catalyst systems having a high ratio of ethylene:comonomer reactivity, as well as a low ratio of polymerization propagation to termination. As a result, the low molecular weight species have substantially higher α-olefin comonomer content and the high molecular weight species have a very low comonomer content.

It has been proposed to use certain metallocenes such as bis(cyclopentadienyl) titanium or zirconium dialkyls in combination with aluminum alkyl/water cocatalyst as a homogeneous catalyst system for the polymerization of olefins. For example: German Patent Application 2,608,863 teaches the use of a catalyst system for the polymerization of ethylene consisting of bis(cyclopentadienyl) titanium dialkyl, aluminum trialkyl and water; German Patent Application 2,608,933 teaches an ethylene polymerization catalyst system consisting of zirconium metallocenes of the general formula (cyclopentadienyl)$_n$ZrY$_{4-n}$, wherein n stands for an integer in the range of 1 to 4, Y for R, CH$_2$AlR$_2$, CH$_2$CH$_2$AlR$_2$ and CH$_2$CH(AlR$_2$)$_2$, wherein R stands for alkyl or metallo alkyl, an aluminum trialkyl cocatalyst and water; European Patent Application No. 0035242 teaches a process for preparing ethylene and atactic propylene polymers in the presence of a halogen-free Ziegler catalyst system of (1) cyclopentadienyl compound of the formula (cyclopentadienyl)$_n$MY$_{4-n}$ in which n is an integer from 1 to 4, M is a transition metal, especially zirconium, and Y is either hydrogen, a C$_1$–C$_5$ alkyl or metallo alkyl group or a radical having the following general formula CH$_2$AlR$_2$, CH$_2$CH$_2$AlR$_2$, and CH$_2$CH(AlR$_2$)$_2$ in which R represents a C$_1$–C$_5$ alkyl or metallo alkyl group, and (2) an alumoxane; and U.S. Pat. No. 4,564,647 teaches a low pressure process for polymerizing ethylene, either alone or in combination with small amounts of other α-olefins, in the presence of a catalyst which may comprise a cyclopentadienyl compound, represented by the formula (Cp)MR$^2$R$^3$R$^4$ wherein (Cp) represents a cyclopentadienyl group, M represents titanium, vanadium, zirconium or hafnium, and R$^2$, R$^3$ and R$^4$ are each an alkyl group having from 1 to 6 carbon atoms, a cyclopentadienyl group, a halogen atom or a hydrogen atom, an alumoxane, which can be prepared by reacting trialkyl aluminum or dialkyl aluminum monohalide with water and a filler. Each of the above patents also teach that the polymerization process employing the homogeneous catalyst system is hydrogen sensitive thereby providing a means to control polymer molecular weight.

As is well known in the prior art, catalyst systems comprising a cyclopentadienyl compound, hereinafter frequently referred to as a metallocene or metallocene catalyst component, and an alumoxane offer several distinct advantages when compared to the more conventional Ziegler-type catalyst systems. For example, the cyclopentadienyl-transition metal/alumoxane catalyst systems, particularly those wherein the cyclopentadienyl compound contains at least one halogen atom, have demonstrated extremely high activity in the polymerization of α-olefins, particularly ethylene. Moreover, these catalyst systems produce relatively high yields of polymer product having a relatively narrow molecular weight distribution. However, these catalyst systems, when used to prepare copolymers of ethylene with longer α-olefins in anything more than a very minor proportion, still suffer from the drawbacks of low incorporation rates, and low molecular weights.

For many applications it is of primary importance for a polyolefin to have a high weight average molecular weight while having a relatively narrow molecular weight distribution. A high weight average molecular weight, when accompanied by a narrow molecular weight distribution, provides a polyolefin or an ethylene-lower-α-olefin copolymer with high strength properties. Traditional Ziegler-Natta catalyst systems—a transition metal compound cocatalyzed by an aluminum alkyl—are capable of producing polyolefins having a high molecular weight but a broad molecular weight distribution.

More recently a catalyst system has been developed wherein the transition metal compound has two or more cyclopentadienyl ring ligands, such transition metal compound also being referred to as a metallocene - which catalyzes the production of olefin monomers to polyolefins. Accordingly, metallocene compounds of the Group IV B metals, particularly, titanocene and zirconocene, have been utilized as the transition metal component in such "metallocene" containing catalyst system for the production of polyolefins and ethylene-α-olefin copolymers. When such metallocenes are cocatalyzed with an aluminum alkyl—as is the case with a traditional type Ziegler-Natta catalyst system—the catalytic activity of such metallocene catalyst system is generally too low to be of any commercial interest. It has since become known that such metallocenes may be cocatalyzed with an alumoxane—rather than an aluminum alkyl—to provide a metallocene catalyst system of high activity which catalyzes the production of polyolefins. The zirconium metallocene species, as cocatalyzed or activated with alumoxane are commonly more active than their hafnium or titanium analogues for the polymerization of ethylene alone or together with a lower α-olefin comonomer.

A wide variety of Group IV B transition metal compounds of the metallocene type have been named as possible candidates for an alumoxane cocatalyzed catalyst system. Hence, although bis(cyclopentadienyl) Group IV B transition metal compounds have been the most preferred and heavily investigated type metallocenes for use in metallocene/alumoxane catalyst for polyolefin production, suggestions have appeared that mono and tris(cyclopentadienyl) transition metal compounds may also be useful. See, for example, U.S. Pat. Nos. 4,522,982; 4,530,914 and 4,701,431. Such mono(cyclopentadienyl) transition metal compounds as have heretofore been suggested as candidates for a metallocene/alumoxane catalyst are mono(cyclopentadienyl) transition metal trihalides and trialkyls.

More recently International Publication No. WO 87/03887 described the use of a composition comprising a transition metal coordinated to at least one cyclopentadienyl and at least one heteroatom ligand as a metallocene type component for use in a metallocene/alumoxane catalyst system for α-olefin polymerization. The composition is broadly defined as a transition metal, preferably of Group IV B of the Periodic Table which is coordinated with at least one cyclopentadienyl ligand and one to three heteroatom ligands, the balance of the coordination requirement being satisfied with cyclopentadienyl or hydrocarbyl ligands. The metallocene/alumoxane catalyst system described is illustrated solely with reference to transition metal compounds which are bis(cyclopentadienyl) Group IV B transition metal compounds.

Therefore, a need still exists for catalyst systems that permit the production of higher molecular weight ethylene-longer-α-olefin copolymers and desirably with a narrow molecular weight distribution and a narrow composition distribution. The present invention addresses the need, then, for a polymerization process which permits the efficient and economically attractive production of high molecular weight ethylene/longer α-olefin copolymers and copolymer products.

SUMMARY OF THE INVENTION

In accordance with the present invention, longer α-olefins are copolymerized with ethylene in the presence of a catalyst system comprising an activated cyclopentadienyl-transition metal compound. Quite surprisingly, it has been found that the longer α-olefins have a polymerization rate on the same order as ethylene when these catalysts are employed, despite the large "tail" of the longer α-olefin. As a result, the longer α-olefin is unexpectedly incorporated into the copolymer at a competitive rate with the ethylene, and the composition distribution is substantially uniform and random.

The present invention resides, at least in part, in the discovery that longer α-olefins (e.g. $C_{10}$–$C_{100}$) can be polymerized with ethylene using certain monocyclopentadienyl metallocene catalysts to obtain a high molecular weight copolymer with a high proportion of longer α-olefin incorporation, a narrow molecular weight distribution and a relatively random and uniform longer α-olefin comonomer distribution. Certain of these copolymers have very surprising properties, such as, for example, modulus, strain to break, rheological properties, storage and loss moduli, dissipative characteristics, and the like, as detailed more completely below.

In one aspect, then, the present invention provides a substantially compositionally uniform copolymer of ethylene and from about 1 to about 50 mole percent, preferably from about 2 to about 30, and especially from about 4 to about 30 mole percent, of a longer α-olefin having at least 10 carbon atoms, preferably at least 12 carbon atoms. The copolymer has a density of from about 0.85 to about 0.95 g/cm$^3$, and can be semicrystalline or amorphous. The copolymer preferably has a weight average molecular weight from about 30,000 to about 1,000,000 daltons or more, more preferably from about 80,000 to about 500,000 daltons, and a molecular weight distribution substantially between about 2 and about 4. The copolymer has a generally uniform comonomer composition distribution.

In another aspect, the present invention provides adhesives comprising a blend of the foregoing copolymer with a tackifier. The present invention also provides useful articles made from the foregoing copolymers, including films, sheets, coatings and molded articles.

In a further aspect, the present invention provides a method of preparing a copolymer by contacting ethylene and α-olefin having at least 10 carbon atoms with a catalyst at polymerization conditions wherein the ethylene:comonomer reactivity ratio is less than about 50. In a preferred embodiment, the foregoing copolymers are prepared by contacting ethylene and a longer α-olefin with a catalyst system comprising an activated Group IV B transition metal component at polymerization conditions, and recovering a high molecular weight, narrow molecular weight copolymer having a generally uniform, random α-olefin composition distribution. The "Group IV B transition metal component" of the catalyst system is represented by the general formula:

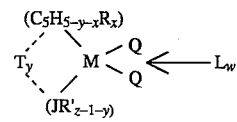

wherein: M is Zr, Hf or Ti and is in its highest formal oxidation state (+4, $d^0$ complex);

($C_5H_{5-y-x}R_x$) is a cyclopentadienyl ring which is substituted with from zero to five substituent groups R, "x" is 0, 1, 2, 3, 4 or 5 denoting the degree of substitution, and each substituent group R is, independently, a radical selected from a group consisting of $C_1$–$C_{20}$ hydrocarbyl radicals, substituted $C_1$–$C_{20}$ hydrocarbyl radicals wherein one or more hydrogen atoms is replaced by a halogen radical, an amido radical, a phosphido radical, an alkoxy radical, an alkylborido radical, or any other radical containing a Lewis acidic or basic functionality, $C_1$–$C_{20}$ hydrocarbyl-substituted metalloid radicals wherein the metalloid is selected from the Group IV A of the Periodic Table of Elements, and halogen radicals, amido radicals, phosphido radicals, alkoxy radicals, alkylborido radicals or any other radical containing Lewis acidic or basic functionality or ($C_5H_{5-y-x}R_x$) is a cyclopentadienyl ring in which two adjacent R-groups are joined forming a $C_4$–$C_{20}$ ring to give a saturated or unsaturated polycyclic cyclopentadienyl ligand such as indenyl, tetrahydroindenyl, fluorenyl or octahydrofluorenyl;

($JR'_{z-1-y}$) is a heteroatom ligand in which J is an element with a coordination number of three from Group V A or an element with a coordination number of two from Group VI A of the Periodic Table of Elements, preferably nitrogen, phosphorus, oxygen or sulfur, and each R' is, independently, a radical selected from the group consisting of $C_1$–$C_{20}$ hydrocarbyl radicals, substituted $C_1$–$C_{20}$ hydrocarbyl radicals wherein one or more hydrogen atoms is replaced by a halogen radical, an amido radical, a phosphido radical, an alkoxy radical, an alkylborido radical or any other radical containing a Lewis acidic or basic functionality and "z" is the coordination number of the element J;

Each Q may be independently any univalent anionic ligand such as halogen, hydride, or substituted or unsubstituted $C_1$–$C_{20}$ hydrocarbyl, alkoxide, aryloxide, amide, arylamide, phosphide or arylphosphide, provided that where any Q is a hydrocarbyl such Q is different from $(C_5H_{5-y-x}R_x)$ or both Q together may be an alkylidene or a cyclometallated hydrocarbyl or any other divalent anionic chelating ligand;

"y" is 0 or 1 when w is greater than 0; y is 1 when w is 0; when "y" is 1, T is a covalent bridging group containing a Group IV A or V A element such as, but not limited to, a dialkyl, alkylaryl or diaryl silicon or germanium radical, alkyl or aryl phosphine or amine radical, or a hydrocarbyl radical such as methylene, ethylene and the like;

L is a Lewis base such as diethylether, tetraethylammonium chloride, tetrahydrofuran, dimethylaniline, aniline, trimethylphosphine, n-butylamine, and the like; and "w" is a number from 0 to 3; L can also be a second transition metal compound of the same type such that the two metal centers M and M' are bridged by Q and Q' wherein M' has the same meaning as M and Q' has the same meaning as Q. Such compounds are represented by the formula:

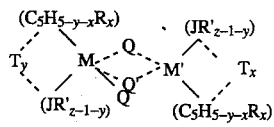

The metallocene catalyst component can be activated by an alumoxane component represented by the formulas: $(R^3\text{-Al-O})_m$; $R^4(R^5\text{-Al-O})_m$—$AlR^6_2$ or mixtures thereof wherein $R^3$–$R^6$ are, independently, a univalent anionic ligand such as a $C_1$–$C_5$ alkyl group or halide and "m" is an integer ranging from 1 to abut 50 and preferably is from about 13 to about 25. Alternatively, the metallocene catalyst component can be activated with a cation capable of donating a proton and a bulky, non-coordinating anion capable of stabilizing the metal cation formed by reaction between the proton provided by the cation and a substituent of the metallocene reactive with the proton.

DETAILED DESCRIPTION OF THE INVENTION

Figure 1:
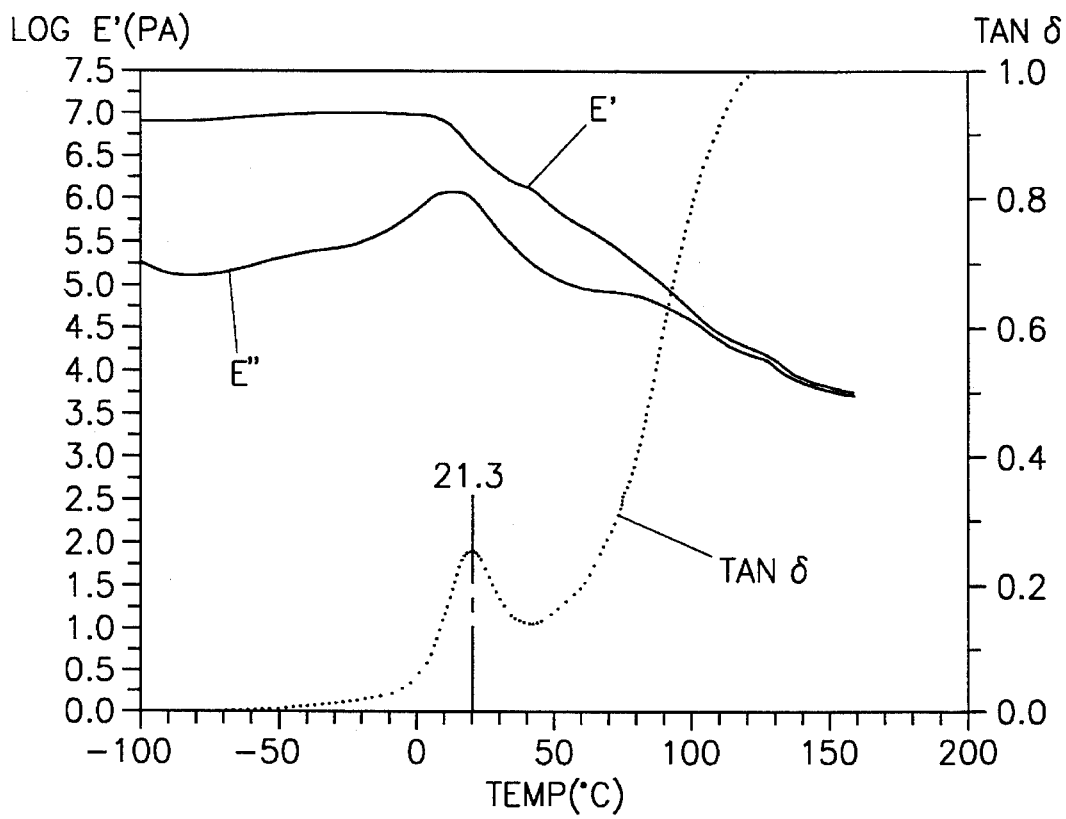
FIG. 1 is a semilog plot of loss tangent versus temperature for an adhesive of the present invention comprising a 60:40 weight blend of ethylene/hexadecene copolymer and ESC-5380 tackifier (Example 23) showing glass transition temperature.

The present invention relates to copolymers of ethylene with longer α-olefins. The longer α-olefins are preferably linear monomers of at least 10 carbon atoms up to about 100 carbon atoms or more. The novel characteristics of the copolymers of the present invention derive from the relatively long pendant alkyl side chains that are introduced by the "tails" of the longer α-olefins comonomers as they are inserted into the generally linear polymer chain. When the side chains reach about 8 carbons in length (corresponding to decene-1 comonomer), and the side chains are sufficiently prevalent in the polymer, the side chains are capable of crystallization and imparting novel characteristics to the polymer. Particularly at side chain lengths of 10 or more carbon atoms (corresponding to $C_{12}$ α-olefin comonomer), the crystallizability of the side chains is more definite and pronounced. Theoretically, any α-olefin up to 100 carbon atoms or more is used to impart side chain crystallizability, but as a practical matter, a-olefins of up to $C_{30}$ of the desired purity are available commercially. Alpha-olefin monomers having more than about 30 carbon atoms generally have a broader distribution of molecular weights, and can also have some branching which influences crystallizability. Thus, the preferred α-olefins in this invention are linear α-olefins having from about 10 to about 100 carbon atoms, more preferably from about 12 to about 30 carbon atoms.

Specific representative examples of the longer α-olefins include 1-decene, 1-undecene, 1-dodecene, 1-tetradecene, 1-hexadecene, 1-octadecene, 1-eicosene, 1-docosene, 1-tetracosene, 1-hexacosene, 1-octacosene, 1-triacontene, 1-dotriacontene, 1-tetracontene, 1-pentacontene, 1-hexacontene, 1-heptacontene, 1-octacontene, 1-nonacontene, 1-hectene and the like. In general, the longer the α-olefin, the more pronounced are the properties imparted thereby, e.g. as the size of the a-olefin increases, the more unlike polyethylene the copolymer becomes. As the size of the comonomer increases, the softness, for example, generally increases while strain to break decreases, up to a point where side chain crystallinity occurs, and then, quite surprisingly, softness decreases with additional comonomer length and strain to break increases. The copolymer can further contain additional monomers usually in relatively minor amounts, which do not substantially adversely affect the novel properties of the copolymers. Such termonomers include vinyl and vinylidene compounds, for example, lower α-olefins having from 3 to 9 carbon atoms, such as propylene, 1-butene, isobutene, 1-pentene, 3-methylpentene-1, 4-methylpentene-1, 1-hexene, 1-heptene, 1-octene, 3,3,5-trimethylpentene-1, 1-nonene, vinyl cyclohexene, and the like; dienes, such as 1,3-butadiene, 1,5-hexadiene and the like; vinyl aromatic monomers, such as styrene or alkyl-substituted styrene and the like; and combinations thereof.

Preferably, the ethylene is interpolymerized with from about 1 to about 50 mole percent longer α-olefin, more preferably from about 2 to about 30 mole percent longer α-olefin, and especially from about 4 to about 30 mole percent longer α-olefin. In general, at an increased longer α-olefin content, the properties imparted by the longer α-olefin are more pronounced, e.g., density and strain to break decrease while softness increases with increasing longer α-olefin content. However, when the α-olefin comonomer content is increased to a point where the side chains become prevalent, e.g. there is side chain crystallization as a separate domain, the softness decreases and strain to break increases significantly.

The polymers of the present invention can vary from completely amorphous to semicrystalline. The ethylene/longer α-olefin copolymers generally have a density from about 0.85 to about 0.95 g/cm$^3$. Amorphous material generally has a density below about 0.87 g/cm$^3$. Semicrystalline polymer is generally in the density range of from about 0.854 to about 0.92 g/cm$^3$. Crystallinity can be influenced by a number of factors, including molecular weight, the size of the longer α-olefin and content thereof, and the composition distribution. In general, copolymers containing about 12 mole percent or more of randomly distributed longer α-olefin are amorphous, whereas copolymers containing less than about 12 mole percent of the longer α-olefin comonomer have more crystallinity as the comonomer content is reduced.

The polymers of the present invention have a surprisingly high molecular weight, preferably from about 30,000 to about 1,000,000 daltons or more, depending on the desired end-use application. As used herein, molecular weight refers to the weight average molecular weight ($M_w$), unless otherwise indicated. The unique characteristics of the longer α-olefin copolymers are not generally observed at lower molecular weights where there is limited chain entanglement. Polymers having a molecular weight higher than this range, while theoretically possible, are difficult to prepare as a practical matter. Most commercially useful polymers, e.g. in film and adhesive applications, have $M_w$ in the range of from about 80,000 to about 500,000 daltons.

The polymers of the present invention have a narrow molecular weight distribution (MWD). This surprising fact is reflected in a low polydispersity, i.e. a ratio of $M_w$ to number average molecular weight ($M_n$). The MWD ($M_w/M_n$) is generally in the range of from about 2 to about 4, even in the copolymers of very high molecular weight.

The copolymers of the present invention are substantially random and quite surprisingly have a fairly uniform longer α-olefin distribution throughout the copolymer. This uniform composition is reflected in a relatively high composition distribution breadth index (CDBI). As used herein, CDBI is defined as the percentage by weight of the copolymer molecules having a longer α-olefin comonomer content within 50 percent of the median molar comonomer content, i.e. ±50 percent of the median $C_{10}$–$C_{100}$ olefin content. Homopolymers such as polyethylene, which do not contain a comonomer, thus have a CDBI of 100%. The CDBI of a copolymer is readily calculated from data obtained by techniques known in the art, such as, for example, temperature rising elution fractionation (TREF) as described in U.S. Ser. No. 151,350 or Wild et al., *J. Poly. Sci, Poly. Phys. Ed.*, vol. 20, p. 441 (1982). The ethylene/longer α-olefin copolymers herein generally have a CDBI on the order of about 70 percent or more, i.e. about 70 percent or more of the copolymer has a molar longer α-olefin comonomer content within ±50 percent of the median comonomer content. In contrast, linear low density polyethylene prepared using conventional Ziegler-Natta catalyst has a CDBI on the order of 30 to 40 percent.

The present polymers comprise linear, comb-like molecules, as opposed to uncontrolled long chain branched polymers. This derives from the use of a single-site coordination catalyst as opposed to a free radical catalyst. The olefin polymerizes in a predominantly head-to-tail fashion so that the polymer molecule has a generally linear main chain formed by polymerization at the carbon-carbon double bond, and a plurality of side chains of controlled length corresponding to the aliphatic "tails" of the longer α-olefin.

The novel characteristics of the ethylene/longer α-olefin copolymers of the present invention, i.e. simultaneously high longer α-olefin content, high $M_w$, narrow MWD and high CDBI, impart a number of unique and, in some cases, rather surprising physical, rheological and other properties to the copolymers. As a consequence, the copolymers have a wide number of uses.

FILMS

For structural film applications, the copolymers are generally semicrystalline, having an α-olefin comonomer content below about 12 or 13 mole percent and a density from about 0.88 to about 0.93 g/cm$^3$. The copolymers are formed into film by blown film or extrusion casting procedures using techniques and equipment well known in the linear, low density polyethylene (LLDPE) arts. The present films have high strength and a Young's modulus similar to conventional LLDPE, but have exceptionally high elongation and strain-to-break, and excellent processability due to rheological properties. The films are unusually soft owing to a relatively low storage modulus compared to copolymers made using smaller α-olefin.

The copolymer can be used in a monolayer film, e.g., a film comprised of a single layer of the copolymer without adjacent layers made of a different polymer. Alternatively, the copolymer can be used as one or more layers in a multi-layer film, e.g. as a structural and/or skin layer. As another option, the copolymer can be used as a cling additive in the cling layer of a film, particularly the amorphous copolymer mentioned above.

The film can include one or more conventional additives, e.g. anticling (slip and/or antiblock) additives which may be added during the production of the copolymer or subsequently blended in. Such additives are well-known in the art and include, for example, silicas, silicates, diatomaceous earths, talcs and various lubricants. These additives are preferably utilized in amounts ranging from about 100 ppm to about 20,000 ppm, more preferably between about 500 ppm to about 10,000 ppm by weight based upon the weight of the copolymer. The copolymer can, if desired, also include one or more other well-known additives such as, for example, tackifiers, antioxidants, ultraviolet absorbers, antistatic agents, release agents, pigments, colorants or the like; however, this again should not be considered a limitation of the present invention.

The film is produced from the ethylene copolymer by any one of a number of well-known extrusion or coextrusion techniques. As preferred examples, any of the blown or chill roll cast processes known in the art can be used.

As previously mentioned, the semicrystalline films of the present invention have properties making them especially well suited for use in a variety of applications. For example, these films can be used in stretch/cling films or made into other forms, such as a tape, by any one of a number of well-known cutting, slitting and/or rewinding operations. Physical properties including, but not limited to, tensile strength, tear strength and elongation can be adjusted over wide ranges by altering the copolymer properties and specifications, as well as additive packages, as appropriate to meet the requirements to a given wrapping, bundling, taping or other application.

For bundling, packaging and unitizing applications, the thermoplastic film of the present invention is stretch-wrapped by any one of a number of well-known procedures around an article or a plurality of articles. Typical of articles suitable for bundling, packaging and unitizing with the present thermoplastic film include, but are not limited to, various foodstuffs (canned or fresh), rolls of carpet, liquid containers and various like goods normally containerized and/or palletized for shipping, storage and/or display.

ADHESIVES

For adhesive applications, the polymers of this invention can be blended with tackifiers and other additives into an adhesive formulation. Suitable tackifiers include those resins which are compatible with the copolymer or copolymer blend. Tackifiers are chosen to impart substantial adhesive strength, promote substrate wetting and generally enhance coating performance.

Tackifier components suitable for use in this invention include aliphatic and aromatic hydrocarbon resins such as ESCOREZ or WINGTACK 95. WINGTACK 95 is the tradename for a diene-olefin copolymer of piperylene and 2-methyl-2-butene having a softening point of 95° C. The resin is prepared by the cationic polymerization of 60 weight percent piperylene, 10 weight percent isoprene, 5 weight percent cyclopentadiene, 15 weight percent 2-methylbutene and about 10 weight percent dimer. See U.S. Pat. No. 3,577,398. Other tackifying resins of the same general type may be employed in which the resinous copolymer comprises 20–80 weight percent of piperylene and 80–20 weight percent of 2-methyl-2-butene. Other adhesion-promoting resins which are also useful in the compositions of this invention include hydrogenated rosins, rosin esters, polyterpenes, terpenephenol resins, and polymerized mixed olefins. Hydrogenated hydrocarbon resins obtained under the trade designation ESCOREZ 5380 and ECR-143H are preferred. These tackifiers typically have a ring and ball softening point from about 10° C. to about 180° C., preferably from about 15° C. to about 75° C. Other hydrocarbon tackifiers obtained from Exxon Chemical Co. under the trade designations ECR-111, and ECR-327 have also been found to be particularly preferred. ECR-143H resin, for example, is prepared by the cationic polymerization of a $C_5$ olefin/diolefin feed stream as described in U.S. Pat. No. 4,916,192 which is hereby incorporated by reference herein.

Pressure sensitive adhesive (PSA) properties are dependent on selection of tackifier resin. Particularly important is the $T_g$ of the tackifier. Tack-related properties can be improved by optimizing the $T_g$ of the PSA system. Selection of tackifier is an important variable in this regard. For example, when tackifiers are blended together, several tack properties can be improved in PSA systems incorporating the blended tackifier over PSA systems incorporating each individual tackifier resin. General tackifier composition is also a strong variable in PSA property optimization.

Adhesive systems which are an embodiment of this invention may contain a tackifier resin in an amount of from about 5 to about 95 parts by weight and the copolymer or copolymers in an amount of from about 5 to about 95 parts by weight, relative to the tackifier parts by weight. Preferred adhesive systems contain the tackifier in an amount of from about 30 to about 70 parts by weight, and copolymer or copolymers in an amount of from about 30 to about 70 parts by weight.

The adhesive composition may further contain relatively minor amounts of ingredients such as, oils, fillers, coupling agents, colorants, antioxidants, and other stabilizing additives which do not substantially adversely affect the system such as, for example, by adversely interfering with adhesion to a substrate surface. The formulation is preferably a hot-melt essentially free of solvents and other vaporizable constituents which detract from the hot-melt characteristics of the formulation, e.g., no need for drying or solvent removal.

Coating systems which are an embodiment of this invention may optionally contain a resin including both tackifiers and other high polymers blended up to about 50 parts by weight and the longer-$\alpha$-olefin/ethylene copolymer in an amount of 50 parts by weight or more wherein the parts by weight of the resin and copolymer components total 100.

Antioxidants or stabilizers, when used, can be added at from about 0.1 to about 3 percent by weight, preferably from about 0.1 to about 1.5 percent by weight, more preferably from about 0.1 to about 1 percent by weight, and typically at about 0.5 weight percent.

The optional oils which may be mentioned include refined hydrocarbon oils typically present in adhesives, including paraffinic, aromatic, and naphthenic oils available under the trade designations KAYDOL (produced by WITCO), TUF-FLO (produced by ARCO), and the like. The refined oils serve to reduce viscosity and improve surface tack properties.

Particulated fillers which may be also used for thickening and price reduction include glass, silica, amorphous $SiO_2$, fumed alumina, calcium carbonate, fibers and the like. Suitable commercially available fillers are available under the trade designations CAB-O-SIL, ZEOSIL 35, AEROSIL R972, DUCRAL 10 and the like.

Suitable coupling agents include (but are not limited to) organometallic compounds such as, for example, silane-based compounds, organotitanates, organozirconates, organozircoaluminates, chrome complexes and the like. These are generally selected to promote adhesion based on the substrates and/or fillers involved in the particular application.

Suitable dyes include Fuchsine (CI 42510), Calcocid Green S (CI 44090), Solvent Yellow 34 (CI 4100B), and the like. Suitable pigments include titanium dioxide, colloidal carbon, graphite, ceramics, clays, phosphor particles and metal particles, e.g. aluminum magnetic iron, copper, and the like.

The coating compositions of this invention are preferably prepared as organic solvent solutions of the copolymer and any other components, although copolymer emulsions and hot melts may also be used if so desired. The coating compositions may be applied to the substrate from a solution of up to about 40 percent weight solids of the ingredients in a solvent such as toluene, the solvent being removed by evaporation to leave a coating on the substrate surface. Alternatively, the ingredients may be mixed in a solvent, the mixture may be emulsified and the solvent evaporated, and the coating may be applied to a substrate as 50–60 percent weight solids emulsion, the water being removed by evaporation with conventional drying equipment and techniques.

For hot melt application, the coating compositions may be prepared by blending the copolymer with any optional component in the melt until a homogeneous blend is obtained. Various methods of blending materials of this type are known to the art, and any method that produces a homogeneous blend is satisfactory. Typical blending equipment includes, for example, mixing extruders, roll mills, Banbury mixers, Brabenders and the like. In general, the blend components blend easily in the melt and a heated vessel equipped with a stirrer is all that is required. The components are added in no particular order, but generally the copolymer is added first and heated in the vessel until molten. Thereafter, any optional components are then added.

The hot melt formulation may be cooled and later reheated for use, or used directly, e.g. supplied from a reservoir or melt pot to a substrate using conventional equipment, for example, for pumping or pressure extrusion through slot dies. Generally, the hot melt is heated sufficiently for a target viscosity of about 100,000 cps, although a viscosity as high as 150,000 cps can usually be tolerated. For suitable pot stability, the viscosity of the hot melt should not increase more than 20 percent when maintained at the pot temperature for a period of 8 hours. An unusual property of the present copolymers and adhesives formulated therewith is a shear-thinning phenomenon. At low shear rates at typical hot melt application temperatures, the copolymer has a relatively high viscosity; but at high rates of shear, the viscosity generally declines, usually in a dramatic fashion. This permits the copolymer adhesive to be sprayed onto a substrate surface, e.g. through a nozzle. The copolymer experiences a high shear rate as it passes through the spraying device, typically including relatively small orifices and/or passageways, and requires less pressure than a conventional polyolefin, if the conventional polyolefin could be sprayed at all. However, once deposited on the substrate surface where there is very little shear, the viscosity is effectively high and advantageously inhibits running or dripping before the copolymer can cool and solidify.

The preparation of coated articles such as films, sheets, plates and molded objects involves the initial step of coating at least a portion of a surface of the selected article with a solution, emulsion or hot melt of the copolymer or adhesive composition. Any suitable coating technique may be employed while applicable substrates, including composites thereof, may be comprised of paper and paperboard; fiberglass; wood; graphite; conductive metals, e.g. copper, aluminum, zinc, and steel, etc.; and semi-conductive substrates such as silicon and gallium arsenide; glass and ceramic; textiles, both natural and synthetic, woven and nonwoven; synthetic resins including the homo- and copolymers of ethylene, propylene, vinyl chloride, vinylidene chloride, vinyl acetate, styrene, isobutylene, and acrylonitrile; polyvinyl acetal; polyethylene terephthalate; polyamides; and cellulose esters such as cellulose acetate and cellulose butyrate. The latter polymeric substrates may contain fillers or reinforcing agents, such as the various synthetic, natural or modified fibers, including, for example, cellulosic fiber, e.g. cotton, cellulose acetate, viscose rayon, and paper; glass; and polyamide fibers. These reinforced substrates may be used in laminated or composite form.

The coating of the copolymer or adhesive composition should be applied to the substrate surface so that upon drying its thickness will be in the range of about 0.05 to about 10 mils. Drying of the wet polymer coating may be achieved by air drying or by the application of any other particular drying technique is favored by the practitioner.

A preferred use of the present invention is in the preparation of pressure-sensitive adhesive tapes or in the manufacture of labels. The pressure-sensitive adhesive tape comprises a flexible backing sheet and a layer of the copolymer or adhesive composition of the novel PSA compound coated on one major surface of the backing sheet. The backing sheet may be a plastic film, paper or any other suitable material and the tape may include various other layers or coatings, such as primers, release coatings and the like, which are used in the manufacture of pressure-sensitive tapes.

The present coating composition may be used as a corrosion resistant barrier coating on various metal surfaces in intimate contact with corrosion-causing fluids or gases including water, seawater, high and low pH fluids, and the like or exposed to a corrosion-causing environment. Examples include, liners in food and beverage containers; liners in vessels, pipes, and miscellaneous equipment used in manufacturing plants, ships, and the like; and anti-rust coatings for automobiles, etc. As other useful coatings, the copolymers may be used as film-forming binders or adhesives in the production of various coating and/or impregnating compositions for application to papers and textiles.

OTHER USES

The copolymer of the present invention has a wide number of uses because of its unique properties which can be varied to suit particular applications. The copolymer can have utility, for example, in film and adhesive applications, as previously mentioned; in applications requiring super tough polymers with the unique morphology of the present copolymer; in polymer blends as a compatibilizer between normally incompatible polymers; in film surface modifications wherein the copolymer is added to or coated on, e.g. a conventional polyethylene, and the film surface can also be subjected to corona discharge or other surface treatment; in polymer processing as an additive to enhance the melt viscosity of the thermoplastic, elastomer or thermoplastic elastomer being processed; in soft elastomer applications, particularly vulcanizable elastomers wherein the copolymer includes a termonomer which imparts vulcanizability; in applications requiring a tactile polymer; in various molding applications, e.g. injection molding, blow molding and thermoforming; and the like.

CATALYST COMPONENT

The present invention relates to copolymers of ethylene and longer α-olefins made by a process comprising polymerizing the longer α-olefins with ethylene in the presence of a catalyst providing a low ethylene:comonomer reactivity ratio, preferably a ratio less than about 50, more preferably less than about 30, especially from about 3 to about 20, and more particularly from about 5 to about 15. A preferred catalyst comprises an activated cyclopentadienyl-transition metal compound wherein the transition metal component is from Group IV B.

The Group IV B transition metal component of the catalyst system is represented by the general formula:

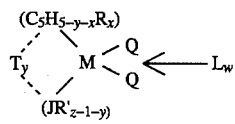

wherein: M is Zr, Hf or Ti and is in its highest formal oxidation state (+4, $d^0$ complex);

$(C_5H_{5-y-x}R_x)$ is a cyclopentadienyl ring which is substituted with from zero to five substituent groups R, "x" is 0, 1, 2, 3, 4 or 5 denoting the degree of substitution, and each substituent group R is, independently, a radical selected from a group consisting of $C_1$–$C_{20}$ hydrocarbyl radicals, substituted $C_1$–$C_{20}$ hydrocarbyl radicals wherein one or more hydrogen atoms is replaced by a halogen radical, an amido radical, a phosphido radical, an alkoxyl radical or any other radical containing a Lewis acidic or basic functionality, $C_1$–$C_{20}$ hydrocarbyl-substituted metalloid radicals wherein the metalloid is selected from the Group IV A of the Periodic Table of Elements, and halogen radicals, amido radicals, phosphido radicals, alkoxy radicals, alkylborido radicals or any other radical containing a Lewis acidic or basic functionality or $(C_5H_{5-y-x}R_x)$ is a cyclopentadienyl ring in which two adjacent R-groups are joined forming $C_4$–$C_{20}$ ring to give a saturated or unsaturated polycyclic cyclopentadienyl ligand such as indenyl, tetrahydroindenyl, fluorenyl or octahydrofluorenyl;

$(JR'_{z-1-y})$ is a heteroatom ligand in which J is an element with a coordination number of three from Group V A or an element with a coordination number of two from Group VIA of the Periodic Table of Elements, preferably nitrogen, phosphorus, oxygen or sulfur with nitrogen being preferred, and each R' is, independently a radical selected from a group consisting of $C_1$–$C_{20}$ hydrocarbyl radicals, substituted $C_1$–$C_{20}$ hydrocarbyl radicals wherein one or more hydrogen atoms is replaced by a halogen radical, an amido radical, a phosphido radical, an alkoxy radical or any other radical containing a Lewis acidic or basic functionality, and "z" is the coordination number of the element J;

Each Q is, independently, any univalent anionic ligand such as halogen, hydride, or substituted or unsubstituted $C_1$–$C_{20}$ hydrocarbyl, alkoxide, aryloxide, amide, arylamide, phosphide or arylphosphide, provided that where any Q is a hydrocarbyl such Q is different from $(C_5H_{5-y-x}R_x)$ or both Q together may be an alkylidene or a cyclometallated hydrocarbyl or any other divalent anionic chelating ligand.

"y" is 0 or 1 when w is greater than 0; y is 1 when w is 0; when "y" is 1, T is a covalent bridging group containing a Group IV A or V A element such as, but not limited to, a dialkyl, alkylaryl or diaryl silicon or germanium radical, alkyl or aryl phosphine or amine radical, or a hydrocarbyl radical such as methylene, ethylene and the like.

L is a Lewis base such as diethylether, tetraethylammonium chloride, tetrahydrofuran, dimethylaniline, aniline, trimethylphosphine, butylamine, and the like; and "w" is a number from 0 to 3; L can also be a second transition metal compound of the same type such that the two metal centers M and M' are bridged by Q and Q' wherein M' has the same meaning as M and Q' has the same meaning as Q. Such compounds are represented by the formula:

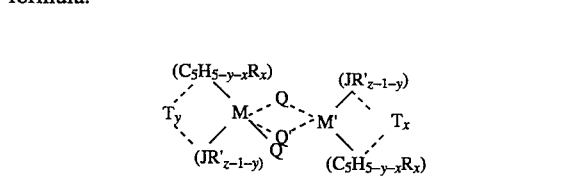

A preferred activator is an alumoxane component which may be represented by the formulas: $(R^3-Al-O)_m$; $R^4(R^5-Al-O)_m$—$AlR^6_2$ or mixtures thereof, wherein $R^3$–$R^6$ are, independently, a univalent anionic ligand such as a $C_1$–$C_5$ alkyl group or halide and "m" is an integer ranging from to about 50 and preferably is from about 13 to about 25.

Examples of the T group which are suitable as a constituent group of the Group IV B transition metal component of the catalyst system are identified in Column 1 of Table 1 under the heading "T".

TABLE 1

| T (when y = 1) | $(C_5H_{5-y-x}R_x)$ | $(JR'_{z-1-y})$ | Q | M |
|---|---|---|---|---|
| dimethylsilyl | cyclopentadienyl | t-butylamido | hydride | zirconium |
| diethylsilyl | methylcyclopentadienyl | phenylamido | chloro | hafnium |
| di-n-propylsilyl | 1,2-dimethylcyclopentadienyl | p-n-butylphenylamido | methyl | titanium |
| diisopropylsilyl | 1,3-dimethylcyclopentadienyl | cyclohexylamido | ethyl | |
| di-n-butylsilyl | indenyl | perflurophenylamido | phenyl | |
| di-t-butylsilyl | 1,2-diethylcyclopentadienyl | n-butylamido | fluoro | |
| di-n-hexylsilyl | tetramethylcyclopentadienyl | methylamido | bromo | |
| methylphenylsilyl | ethylcyclopentadienyl | ethylamido | iodo | |
| ethylmethylsilyl | n-butylcyclopentadienyl | n-propylamido | n-propyl | |
| diphenylsilyl | cyclohexlmethylcyclopentadienyl | isopropylamido | isopropyl | |
| di(p-t-butylphenethylsilyl) | n-octylcyclopentadienyl | benzylamido | n-butyl | |
| n-hexylmethylsilyl | beta-phenylpropylcyclopentadienyl | t-butylphosphido | amyl | |
| cyclopentamethylenesilyl | tetrahydroindenyl | ethylphosphido | isoamyl | |
| cyclotetramethylenesilyl | propylcyclopentadienyl | phenylphosphido | hexyl | |
| cyclotrimethylenesilyl | t-butylcyclopetnadienyl | cyclohexylphosphido | isobutyl | |
| dimethylgermanyl | benzylcyclopentadienyl | oxo (when y = 1) | heptyl | |
| diethylgermanyl | diphenylmethylcyclopentadienyl | sulfido (when y = 1) | octyl | |
| phenylamido | trimethylgermylcyclopentadienyl | methoxide (when y = 0) | nonyl | |
| t-butylamido | trimethylstannylcyclopentadienyl | ethoxide (when y = 0) | decyl | |
| methylamido | triethylplumbylcyclopentadienyl | methylthio (when y = 0) | cetyl | |
| t-butylphosphido | trifluromethylcyclopentadienyl | ethylthio (when y = 0) | methoxy | |
| ethylphosphido | trimethylsilylcyclopentadienyl | | ethoxy | |

TABLE 1-continued

| T (when y = 1) | (C₅H₅₋ᵧ₋ₓRₓ) | (JR'_{z-1-y}) | Q | M |
|---|---|---|---|---|
| phenylphosphido | pentamethylcyclopentadienyl (when y = 0) | | propoxy | |
| methylene | fluorenyl | | butoxy | |
| dimethylmethylene | octahydrofluorenyl | | phenoxy | |
| diethylmethylene | N,N-dimethylamidocyclopentadienyl | | dimethylamido | |
| ethylene | dimethylphosphidocyclopentadienyl | | diethylamido | |
| dimethylethylene | methoxycyclopentadienyl | | methylethylamido | |
| dipropylethylene | (N,N-dimethylamidomethyl)cyclopentadienyl | | diphenylamido | |
| propylene | | | | |
| dimethylpropylene | | | diphenylphosphido | |
| | | | dicyclohexylphosphido | |
| diethylpropylene | | | dimethylphosphido | |
| 1,1-dimethyl-3,3-dimethylpropylene | | | methylidene (both Q) | |
| tetramethyldisiloxane | | | ethylidene (both Q) | |
| 1,1,4,4-tetramethyldisilylethylene | | | propylidene (both Q) | |
| | | | ethyleneglycoldianion (both Q) | |

Exemplary hydrocarbyl radicals for the Q are methyl, ethyl, propyl, butyl, amyl, isoamyl, hexyl, isobutyl, heptyl, octyl, nonyl, decyl, cetyl, 2-ethylhexyl, phenyl and the like, with methyl being preferred. Exemplary halogen atoms for Q include chlorine, bromine, fluorine, and iodine, with chlorine being preferred. Exemplary alkoxides and aryloxides for Q are methoxide, phenoxide and substituted phenoxides such as 4-methylphenoxide. Exemplary amides for Q are dimethylamide, diethylamide, methylethylamide, di-t-butylamide, diisopropylamide and the like. Exemplary amides for Q are dimethylamide, diethylamide, methylethylamide, di-t-butylamide, diisopropylamide and the like. Exemplary aryl amides are diphenylamide and any other substituted phenyl amides. Exemplary phosphides for Q are diphenylphosphide, dicyclohexylphosphide, diethylphosphide, dimethylphosphide and the like. Exemplary alkyldiene radicals for both Q together are methylidene, ethylidene and propylidene. Examples of the Q group which are suitable as a constituent group or element of the Group IV B transition metal component of the catalyst system are identified in Column 4 of Table 1 under the heading "Q".

Suitable hydrocarbyl and substituted hydrocarbyl radicals, which may be substituted as an R group for at least one hydrogen atom in the cyclopentadienyl ring, will contain from 1 to about 20 carbon atoms and include straight and branched alkyl radicals, cyclic hydrocarbon radicals, alkyl-substituted cyclic hydrocarbon radicals, aromatic radicals, alkyl-substituted aromatic radicals, phosphido substituted hydrocarbon radicals, alkoxy substituted hydrocarbon radicals, alkylborido substituted radicals and cyclopentadienyl rings containing one or more fused saturated or unsaturated rings. Suitable organometallic radicals, which may be substituted as an R group for at least one hydrogen atom in the cyclopentadienyl ring, include trimethylsilyl, triethylsilyl, ethyldimethylsilyl, methyldiethylsilyl, triphenylgermyl, trimethylgermyl and the like. Other suitable radicals that may be substituted for one or more hydrogen atom in the cyclopentadienyl ring include halogen radicals, amido radicals, phosphido radicals, alkoxy radicals, alkylborido radicals and the like. Examples of cyclopentadienyl ring groups (C₅H₅₋ᵧ₋ₓRₓ) which are suitable as a constituent group of the Group IV B transition metal component of the catalyst system are identified in Column 2 of Table 1 under the heading (C₅H₅₋ᵧ₋ₓRₓ).

Suitable hydrocarbyl and substituted hydrocarbyl radicals, which may be used as an R' group in the heteroatom J ligand group, will contain from 1 to about 20 carbon atoms and include straight and branched alkyl radicals, cyclic hydrocarbon radicals, alkyl-substituted cyclic hydrocarbon radicals, aromatic radicals, alkyl-substituted aromatic radicals, halogen radicals, amido radicals, phosphido radicals, alkylborido radicals and the like. Examples of heteroatom ligand groups (JR'_{z-1-y}) which are suitable as a constituent group of the Group IV B transition metal component of the catalyst system re identified in Column 3 of Table 1 under the heading (JR'_{z-1-y}).

Table 1 depicts representative constituent moieties for the "Group IV B transition metal component" the list is for illustrative purposes only and should not be construed to be limiting in any way. A number of final components may be formed by permuting all possible combinations of the constituent moieties with each other. Illustrative compounds are: dimethylsilyltetramethyl-cyclopentadienyl-tert-butylamido zirconium dichloride, dimethylsilyltetramethylcyclopentadienyl-tert-butylamido hafnium dichloride, dimethylsilyl-tert-butyl-cyclopentadienyl-tert-butylamido hafnium dichloride, dimethylsilyltrimethylsilylcyclopentadienyl-tert-butylamido zirconium dichloride, dimethylsilyltetramethylcyclopentadienylphenylamido zirconium dichloride, dimethylsilyltetramethylcyclopentadienylphenylamido hafnium dichloride, methylphenylsilyl-tetramethylcyclopentadienyl-tert-butylamido zirconium dichloride, methylphenylsilyltetramethylcyclopentadienyl-tert-butylamido hafnium dichloride, methylphenylsilyl-tetramethylcyclopentadienyl-tert-butylamido hafnium dimethyl, dimethylsilyltetramethylcyclopentadienyl-p-n-butylphenylamido zirconium dichloride, dimethylsilyl-tetramethylcyclopentadienyl-p-n-butylphenylamido hafnium dichloride.

As noted, titanium species of the Group IV B transition metal compound have generally been found to yield catalyst systems which in comparison to their zirconium or hafnium analogues, are of higher activity and α-olefin comonomer incorporating ability. Illustrative, but not limiting of the titanium species which exhibit such superior properties are methylphenylsilyltetramethylcyclopentadienyl-tert-butylamido titanium dichloride, dimethylsilyltetramethylcyclopentadienyl-p-n-butylphenylamido titanium dichloride, dimethylsilyltetramethylcyclopentadienyl-p-methoxyphenylamido titanium dichloride, dimethylsilyl-tert-butylcyclopentadienyl-2,5-di-tert-butylphenylamido titanium dichloride, dimethylsilylindenyl-tert-butylamido titanium dichloride, dimethylsilyltetramethylcyclopentadienylcyclohexylamido titanium dichloride, dimethylsilylfluorenylcyclohexylamido titanium dichloride, dimethylsilyltetramethylcyclopentadienylphenylamido titanium dichloride, dimethylsilyl-tetramethylcyclopentadienyl-tert-butylamido titanium dichloride, dimethylsilyltetramethylcyclopentadienylcyclododecylamido titanium dichloride, and the like.

For illustrative purposes, the above compounds and those permuted from Table 1 do not include the Lewis base ligand (L). The conditions under which complexes containing Lewis base ligands such as ether or those which form dimers is determined by the steric bulk of the ligands about the metal center. For example, the t-butyl group in $Me_2Si(Me_4C_5)(N\text{-}t\text{-}Bu)ZrCl_2$ has greater steric requirements than the phenyl group in $Me_2Si(Me_4C_5)(NPh)ZrCl_2 \cdot Et_2O$ thereby not permitting ether coordination in the former compound. Similarly, due to the decreased steric bulk of the trimethylsilylcyclopentadienyl group in $[Me_2Si(Me_3SiC_5H_3)(N\text{-}t\text{-}Bu)ZrCl_2]_2$ versus that of the tetramethylcyclopentadienyl group in $Me_2Si(Me_4C_5)(N\text{-}t\text{-}Bu)ZrCl_2$, the former compound is dimeric and the latter is not.

Generally the bridged species of the Group IV B transition metal compound ("y"=1) are preferred. These compounds can be prepared by reacting a cyclopentadienyl lithium compound with a dihalo compound whereupon a lithium halide salt is liberated and a monohalo substituent is covalently bound to the cyclopentadienyl compound. The substituted cyclopentadienyl reaction product is next reacted with a lithium salt of a phosphide, oxide, sulfide or amide (for the sake of illustrative purposes, a lithium amide) whereupon the halo element of the monohalo substituent group of the reaction product reacts to liberate a lithium halide salt and the amine moiety of the lithium amide salt is covalently bound to the substituent of the cyclopentadienyl reaction product. The resulting amine derivative of the cyclopentadienyl product is then reacted with an alkyl lithium reagent whereupon the labile hydrogen atoms, at the carbon atom of the cyclopentadienyl compound and at the nitrogen atom of the amine moiety covalently bound to the substituent group, react with the alkyl of the lithium alkyl reagent to liberate the alkane and produce a dilithium salt of the cyclopentadienyl compound. Thereafter the bridged species of the Group IV B transition metal compound is produced by reacting the dilithium salt cyclopentadienyl compound with a Group IV B transition metal preferably a Group IV B transition metal halide.

Unbridged species of the Group IV B transition metal compound can be prepared from the reaction of a cyclopentadienyl lithium compound and a lithium salt of an amine with a Group IV B transition metal halide.

Suitable, but not limiting, Group IV B transition metal compounds which may be utilized in the catalyst system of this invention include those bridged species ("y"=1) wherein the T group bridge is a dialkyl, diaryl or alkylaryl silane, or methylene or ethylene. Exemplary of the more preferred species of bridged Group IV B transition metal compounds are dimethylsilyl, methylphenylsilyl, diethylsilyl, ethylphenylsilyl, diphenylsilyl, ethylene or methylene bridged compounds. Most preferred of the bridged species are dimethylsilyl, diethylsilyl and methylphenylsilyl bridged compounds.

Suitable Group IV B transition metal compounds which are illustrative of the unbridged ("y"=0) species which may be utilized in the catalyst systems of this invention are exemplified by pentamethylcyclopentadienyldi-t-butylphosphinodimethyl hafnium; pentamethylcyclopentadienyldi-t-butylphosphinomethylethyl hafnium; cyclopentadienyl-2-methylbutoxide dimethyl titanium.

To illustrate members of the Group IV B transition metal component, select any combination of the species in Table 1. An example of a bridged species would be dimethylsilylcyclopentadienyl-t-butylamidodichloro zirconium; an example of an unbridged species would be cyclopentadienyldi-t-butylamidodichloro zirconium.

Those species of the Group IV B transition metal component wherein the metal is titanium have been found to impart beneficial properties to a catalyst system which are unexpected in view of what is known about the properties of bis(cyclopentadienyl) titanium compounds which are cocatalyzed by alumoxanes. Whereas titanocenes in their soluble form are generally unstable in the presence of aluminum alkyls, the monocyclopentadienyl titanium metal components of this invention, particularly those wherein the heteroatom is nitrogen, generally exhibit greater stability in the presence of aluminum alkyls and higher catalyst activity rates.

Further, the titanium species of the Group IV B transition metal component catalyst of this invention generally exhibit higher catalyst activities and the production of polymers of greater molecular weight than catalyst systems prepared with the zirconium or hafnium species of the Group IV B transition metal component.

Generally, wherein it is desired to produce an α-olefin copolymer which incorporates a high content of α-olefin, while maintaining high molecular weight polymer the species of Group IV B transition metal compound preferred is one of titanium. The most preferred species of titanium metal compounds are represented by the formula:

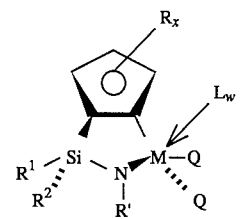

wherein Q, L, R', R, "x" and "w" are as previously defined and $R^1$ and $R^2$ are each independently a $C_1$ to $C_{20}$ hydrocarbyl radicals, substituted $C_1$ and $C_{20}$ hydrocarbyl radicals wherein one or more hydrogen atom is replaced by a halogen atom; $R^2$ and $R^3$ may also be joined forming a $C_3$ to $C_{20}$ ring which incorporates the silicon bridged. Suitable hydrocarbyl and substituted hydrocarbyl radicals which may be used as an R' group have been described previously. Preferred R' groups include those bearing primary carbons bonded directly to the nitrogen atom such as methyl, ethyl, n-propyl, n-butyl, n-hexyl, n-octyl, n-decyl, n-dodecyl, n-tetradecyl, n-hexadecyl, n-octadecyl, benzyl and the like, and those bearing secondary carbons bonded directly to the nitrogen atom such as 2-propyl, 2-butyl, 3-pentyl, 2-heptyl, 2-octyl, cyclopropyl, cyclobutyl, cyclopentyl, cyclohexyl, cycloheptyl, cyclooctyl, cyclododecyl, 2-norbornyl and the like.

Also, the most preferred cyclopentadienyl ring is tetramethylcyclopentadiene (R=Me and x=4).

The alumoxane component of the catalyst system is an oligomeric compound which may be represented by the general formula $(R^3\text{-Al-O})_m$ which is a cyclic compound, or may be $R^4(R^5\text{-Al-O-})_m\text{---AlR}^6{}_2$ which is a linear compound. An alumoxane is generally a mixture of both the linear and cyclic compounds. In the general alumoxane formula $R^3$, $R^4$, $R^5$, and $R^6$ are, independently a univalent anionic ligand such as a $C_1$–$C_5$ alkyl radical, for example, methyl, ethyl, propyl, butyl, pentyl or halide and "m" is an integer from 1 to abut 50. Most preferably, $R^3$, $R^4$, $R^5$ and $R^6$ are each methyl and "m" is at least 4. When an alkyl aluminum halide is employed in the preparation of alumoxane, one or more of $R^{3-6}$ could be halide.

As is now well known, alumoxanes can be prepared by various procedures. For example, a trialkyl aluminum may be reacted with water, in the form of a moist inert organic solvent; or the trialkyl aluminum may be contacted with a hydrated salt, such as hydrated copper sulfate suspended in an inert organic solvent, to yield an alumoxane. Generally, however prepared, the reaction of a trialkyl aluminum with a limited amount of water yields a mixture of both the linear and cyclic species of alumoxane.

Suitable alumoxanes which may be utilized in the catalyst systems of this invention are those prepared by the hydrolysis of a alkylaluminum reagent; such as trimethylaluminum, triethyaluminum, tripropylaluminum, triisobutylaluminum, dimethylaluminumchloride, diisobutylaluminumchloride, diethylaluminumchloride, and the like. Mixtures of different alkyl aluminum reagents in preparing an alumoxane may also be used. The most preferred alumoxane for use is methylalumoxane (MAO), particularly methylalumoxanes having a reported average degree of oligomerization of from about 4 to about 25 ("m"=4 to 25) with a range of 13 to 25 being most preferred.

As an alternative to the alumoxane activation, the metallocene component can be ionically activated using the procedures and techniques set forth in Turner et al., U.S. Ser. No. 133,052, filed Dec. 21, 1987; Turner et al., U.S. Ser. No. 133,480, filed Dec. 22, 1987; Greg et al., U.S. Ser. No. 542,236, filed Jun. 22, 1990; and EP Publication Nos. 277,004; 418,044; and 426,637; all of which are hereby incorporated by reference. Briefly, for ionic activation, the metallocene has at least one substituent capable of reacting with a proton. The metallocene is activated by reaction with a proton-donating cation and a bulky, non-coordinating anion which stabilizes the metal cation formed by the metallocene-proton reaction. Typically, Q in the above formula is hydrocarbyl, the cation is trialkylammonium, for example, and the anion is tetraperfluorophenyl borate, for example.

CATALYST SYSTEMS

The catalyst systems employed in the method of the invention comprise a complex formed upon admixture of the Group IV B transition metal component with an activating component. The catalyst system may be prepared by addition of the requisite Group IV B transition metal and alumoxane components, or a previously cationically activated Group IV B transition metal component, to an inert solvent in which olefin polymerization can be carried out by a solution, slurry or bulk phase polymerization procedure.

The catalyst system may be conveniently prepared by placing the selected Group IV B transition metal component and the selected alumoxane or ionic activating component(s), in any order of addition, in an alkane or aromatic hydrocarbon solvent, preferably one which is also suitable for service as a polymerization diluent. Where the hydrocarbon solvent utilized is also suitable for use as a polymerization diluent, the catalyst system may be prepared in situ in the polymerization reactor. Alternatively, the catalyst system may be separately prepared, in concentrated form, and added to the polymerization diluent in a reactor. Or, if desired, the components of the catalyst system may be prepared as separate solutions and added to the polymerization diluent in a reactor, in appropriate ratios, as is suitable for a continuous liquid polymerization reaction procedure. Alkane and aromatic hydrocarbons suitable as solvents for formation of the catalyst system and also as a polymerization diluent are exemplified by, but are not necessarily limited to, straight and branched chain hydrocarbons such as isobutane, butane, pentane, hexane, heptane, octane and the like, cyclic and alicyclic hydrocarbons such as cyclohexane, cycloheptane, methylcyclohexane, methylcycloheptane and the like, and aromatic and alkyl-substituted aromatic compounds such as benzene, toluene, xylene and the like. Suitable solvents also include liquid olefins which may act as monomers or comonomers, including ethylene, propylene, 1-butene, 1-hexene and the like, particularly when the catalyst components are prepared as separate solutions.

In accordance with this invention optimum results are generally obtained wherein the Group IV B transition metal compound is present in the polymerization diluent in a concentration of preferably from abut 0.00001 to about 10.0 millimoles/liter of diluent and the alumoxane component, when used, is present in an amount to provide a molar aluminum to transition metal ratio of from about 0.5:1 to about 20,000:1. Sufficient solvent is normally used so as to provide adequate heat transfer away from the catalyst components during reaction and to permit good mixing.

The catalyst system ingredients, that is, the Group IV B transition metal, the alumoxane and/or ionic activators, and polymerization diluent, can be added to the reaction vessel rapidly or slowly. The temperature maintained during the contact of the catalyst components can vary widely, such as, for example, from −100° C. to 300° C. Greater or lesser temperatures can also be employed. Preferably, during formation of the catalyst system, the reaction is maintained within a temperature of from about 25° C. to 100° C., most preferably about 25° C.

At all times, the individual catalyst system components, as well as the catalyst system once formed, are protected from oxygen and moisture. Therefore, the reactions are performed in an oxygen and moisture free atmosphere and, where the catalyst system is recovered separately it is recovered in an oxygen and moisture free atmosphere. Preferably, therefore, the reactions are performed in the presence of an inert dry gas such as, for example, helium or nitrogen.

POLYMERIZATION PROCESS

In a preferred embodiment of the process of this invention the catalyst system is utilized in the liquid phase (slurry, solution, suspension or bulk phase or combination thereof), high pressure fluid phase or gas phase polymerization of an olefin monomer. These processes may be employed singularly or in series. The liquid phase process comprises the steps of contacting a longer α-olefin monomer and ethylene with the catalyst system in a suitable polymerization diluent and reacting said monomers in the presence of said catalyst system for a time and at a temperature sufficient to produce a polyolefin of high molecular weight. Conditions most preferred for the copolymerization of ethylene are those wherein ethylene is submitted to the reaction zone at pressures of from about 0.019 psia to about 50,000 psia and the reaction temperature is maintained at from about −100° C. to about 300° C. The aluminum to transition metal molar ratio is preferably from about 1:1 to 18,000 to 1. A more preferable range would be 1:1 to 2000:1. The reaction time is preferably from about 10 seconds to about 4 hours. Without limiting in any way the scope of the invention, one means for carrying out the process of the present invention for production of a copolymer is as follows: in a stirred-tank reactor liquid α-olefin monomer is introduced, such as 1-dodecene. The catalyst system is introduced via nozzles in either the vapor or liquid phase. Feed ethylene gas is introduced either into the vapor phase of the reactor, or sparged into the liquid phase as is well known in the art. The reactor contains a liquid phase composed substantially of liquid -olefin comonomer, together with dissolved ethylene gas, and a vapor phase containing vapors of all monomers. The reactor temperature and pressure may be controlled via reflux of vaporizing α-olefin monomer (autorefrigeration), as well as by cooling coils, jackets etc. The polymerization rate is generally controlled by the concentration of catalyst. The ethylene content of the polymer product is determined by the ratio of ethylene to α-olefin comonomer in the reactor, which is controlled by manipulating the relative feed rates of these components to the reactor.

As before noted, a catalyst system wherein the Group IV B transition metal component is a titanium species has the ability to incorporate high contents of longer α-olefin comonomers. Accordingly, the selection of the Group IV B transition metal component is another parameter which may be utilized as a control over the ethylene content of a copolymer within a reasonable ratio of ethylene to longer α-olefin comonomer.

EXAMPLES

CATALYST PREPARATION

All catalyst preparation and polymerization procedures were performed under an inert atmosphere of helium or nitrogen. Solvent choices were often optional, for example, in most cases either pentane or 30–60 petroleum ether could be interchanged. The choice between tetrahydrofuran (THF) and diethyl ether was a bit more restricted, but in several reactions, either could be used. The lithiated amides were prepared from the corresponding amines and either n-butyllithium (n-BuLi) or methyllithium (MeLi). Tetramethylcyclopentadienyllithium ($C_5Me_4HLi$) was prepared according to the procedures of C. M. Fendrick et al., *Organometallics,* 1984, 3, 819 and F. H. Kohler and K. H. Doll, *Z Naturforsch,* 1982, 376, 144. Other lithiated substituted cyclopentadienyl compounds were generally prepared from the corresponding cyclopentadienyl ligand and n-BuLi or MeLi, or by reaction of MeLi with the proper fulvene. $TiCl_4$ was typically used in its etherate form. The etherate was generally prepared by simply adding $TiCl_4$ to ether, filtering off the solid product and vacuum drying. $TiCl_4$, $ZrCl_4$, $HfCl_4$, amines, silanes, substituted and unsubstituted cyclopentadienyl compounds or precursors, and lithium reagents were purchased from Aldrich Chemical Company or Petrarch Systems. Methylalumoxane was supplied by either Schering or Ethyl Corporation.

$C_5Me_4HLi$ (10.0 g, 0.078 mol) was slowly added to $Me_2SiCl_2$ (11.5 ml, 0.095 mol, in 225 ml of THF solution). The solution was stirred for 1 hour to assure a complete reaction. The solvent was then removed in vacuo. Pentane was added to precipitate the LiCl. The mixture was filtered through diatomaceous earth and the solvent was removed from the filtrate in vacuo. Tetramethylcyclopentadienyldimethylchlorosilane, $(C_5Me_4H)SiMe_2Cl$, (15.34 g, 0.071 mol) was recovered as a pale yellow liquid.

$(C_5Me_4H)SiMe_2Cl$ (8.0 g, 0.037 mol) was slowly added to a suspension of lithium cyclododecylamine ($LiHNC_{12}H_{23}$) (7.0 g, 0.037 mol, ~80 ml THF). The mixture was stirred overnight. The THF was then removed by vacuum to a cold trap held at −196° C. A mixture of petroleum ether and toluene was added to precipitate the LiCl. The mixture was filtered through diatomaceous earth. The solvent was removed from the filtrate. Tetramethylcyclopentadienyl aminocyclododecyldimethylsilane, $Me_2Si(C_5Me_4H)(NHC_{12}H_{23})$, (11.8 g, 0.033 mol) was isolated as a pale yellow liquid.

$Me_2Si(C_5Me_4H)(NHC_{12}H_{23})$ (11.9 g, 0.033 mol) was diluted with ~150 ml of ether. MeLi (1.4 M, 47 ml, 0.066 mol) was added slowly, and the mixture was stirred for 2 hours. The ether was reduced in volume by evaporation. The product was filtered off. The product $[Me_2Si(C_5Me_4)(NC_{12}H_{23})]Li_2$, was washed with several small portions of ether, then vacuum dried to yield 11.1 g (0.030 mol).

$[Me_2Si(C_5Me_4)(NC_{12}H_{23})]Li_2$ (3.0 g, 0.008 tool) was suspended in cold ether. $TiCl_4.2Et_2O$ (2.7 g, 0.008 mol) was slowly added and the resulting mixture was stirred overnight. The ether was removed via a vacuum to a cold trap held at −196° C. Methylene chloride was added to precipitate the LiCl. The mixture was filtered through diatomaceous earth. The solvent was significantly reduced in volume by evaporation and petroleum ether was added to precipitate the product. This mixture was refrigerated prior to filtration in order to maximize precipitation. The solid collected was recrystallized from methylene chloride and $Me_2Si(C_5Me_4)(NC_{12}H_{23})TiCl_2$ was isolated (1.0 g, 2.1 mmol).

POLYMERIZATION EXAMPLES 1–21

Polymerization was done in a 1-liter autoclave reactor equipped with a paddle stirrer, an external water jacket for temperature control, a regulated supply of dry nitrogen, ethylene, propylene, 1-butene and hexane, and a septum inlet for introduction of other solvents or comonomers, transition metal compound and alumoxane solutions. The reactor was dried and degassed thoroughly prior to use. A typical run consisted of injecting a quantity of solvent (typically toluene), the comonomer and 1.0 M methylalumoxane (MAO) into the reactor. The reactor was then heated to the specified temperature and the transition metal compound solution and the ethylene at a pressure of 4.08 atm were introduced into the system. The polymerization reaction was limited to a specified time, typically 30 minutes. The reaction was ceased by rapidly cooling and venting the system, and the resulting polymer was recovered by evaporating the solvent under a stream of nitrogen.

Remaining process run conditions are given in Table including the amount of transition metal catalyst solution (TMC) used, the amount of methylalumoxane solution used, the Al/Ti molar ratio, the amount of toluene and comonomer used, the polymerization temperature, polymer yield, catalyst efficiencies in terms of kg polymer per mole catalyst·atm·hr and kg polymer per mole catalyst·hr and catalyst reactivity ratio.

For example, 390 ml of toluene, 6 ml of 1 M MAO and 10 ml of 1-decene were added to the reactor described above. The reactor was heated to 80° C. prior to introducing 1.2 ml of the catalyst stock solution made by dissolving 13.5 mg of the transition metal compound in 10 ml of toluene. The reactor was then immediately pressurized with 4.08 atm of ethylene. The polymerization reaction was limited to 30 minutes after which time the reaction was ceased by rapidly cooling and venting the system. The resulting polymer (39 g) was recovered by evaporating the solvent under a stream of nitrogen. Catalyst productivity was calculated at 5,212 (kg polymer/mol TMC-atm-hr) and 23,038 (kg polymer/mol TMC-hr). Polymer characteristics include a GPC/DRI PE molecular weight of 123,000 daltons, a molecular weight distribution of 2.6, 3.2 mole percent incorporated 1-decene giving a catalyst reactivity ratio of 18.7 ethylene to 1-decene, a polymer density of 0.914 g/ml, a melting point of 118° C. and a $T_g$ of $-100°$ C.($T_{\alpha}$) and $-70°$ C.($T_{\beta}$).

TABLE 2

| fro O | | TMC Stock (mg/ 10 ml) | TMC Stock Used (ml) | TMC Stock Used (mg) | Al/M | TOLUENE (ml) | OLEFIN (ml) | POLY-MER YIELD (g) | PRODUCTIVITY (kg P/mol TMC · atm · hr) | PRODUCTIVITY (kg P/mol TMC · hr) |
|---|---|---|---|---|---|---|---|---|---|---|
| 2 | 1-decene | 13.5 | 1 | 1.35 | 2127 | 395 | 5 | 20 | 3475 | 14,177 |
| 3 | 1-decene | 13.5 | 1.2 | 1.62 | 1772 | 390 | 10 | 39 | 5647 | 23,038 |
| 4 | 1-decene | 13.5 | 1 | 1.35 | 2127 | 380 | 20 | 40 | 6950 | 28,354 |
| 5 | 1-decene | 13 | 1 | 1.30 | 2208 | 350 | 50 | 52 | 9382 | 38,278 |
| 6 | 1-dodecene | 13.4 | 1 | 1.34 | 2142 | 395 | 5 | 10 | 1750 | 7,141 |
| 7 | 1-dodecene | 13.5 | 1 | 1.35 | 2127 | 390 | 10 | 88 | 15,289 | 62,380 |
| 8 | 1-dodecene | 13.4 | 1 | 1.34 | 2142 | 375 | 25 | 45 | 7,877 | 32,137 |
| 9 | 1-dodecene | 13.4 | 1 | 1.34 | 2142 | 350 | 50 | 60 | 10,502 | 42,849 |
| 10 | 1-dodecene | 13.4 | 1 | 1.34 | 2142 | 300 | 100 | 70 | 12,253 | 49,990 |
| 11 | 1-tetradecene | 13.5 | 1 | 1.35 | 2127 | 395 | 5 | 32 | 5560 | 22,683 |
| 12 | 1-tetradecene | 13.5 | 1 | 1.35 | 2127 | 390 | 10 | 41 | 7123 | 29,063 |
| 13 | 1-tetradecene | 13.4 | 1 | 1.34 | 2142 | 375 | 25 | 35 | 6126 | 24,995 |
| 14 | 1-tetradecene | 13.4 | 1 | 1.34 | 2142 | 350 | 50 | 40 | 7001 | 28,566 |
| 15 | 1-hexadecene | 13.5 | 1 | 1.35 | 2127 | 395 | 5 | 17 | 2954 | 12,051 |
| 16 | 1-hexadecene | 13.5 | 1 | 1.35 | 2127 | 390 | 10 | 22 | 3822 | 15,595 |
| 17 | 1-hexadecene | 13.5 | 1 | 1.35 | 2127 | 380 | 20 | 30 | 5212 | 21,266 |
| 18 | 1-octadecene | 13.5 | 1 | 1.35 | 2127 | 395 | 5 | 12 | 2085 | 8,506 |
| 19 | 1-octadecene | 13.5 | 1 | 1.35 | 2127 | 390 | 10 | 16 | 2780 | 11,342 |
| 20 | 1-octadecene | 13.5 | 1 | 1.35 | 2127 | 380 | 20 | 25 | 4344 | 17,721 |
| 21 | 1-octadecene | 12 | 1 | 1.20 | 2392 | 350 | 50 | 47 | 9197 | 37,481 |

Resulting polymer characteristics are given in Table including weight average molecular weight, molecular weight distribution, comonomer concentration, polymer density, melting point and glass transition temperatures (both $T_\alpha$ and $T_\beta$).

TABLE 3

| EX. | OLEFIN USED | MW[a] (daltons) | MWD | mol % α-OLEFIN | $r_1$ | POLYMER DENSITY (g/ml) | Tm (°C.) | Tg (°C.) ($T_\alpha/T_\beta$) | MODULUS (psi) | STRAIN TO BREAK (%) |
|---|---|---|---|---|---|---|---|---|---|---|
| 2 | 1-decene | 85,000 | 2.3 | 3.8 | 7.8 | 0.929 | — | −106/−22 | 7800 | 590 |
| 3 | 1-decene | 123,100 | 2.6 | 3.2 | 18.7 | 0.914 | 118 | −100/−70 | 7850 | 487 |
| 4 | 1-decene | 108,200 | 2.2 | 8.2 | 13.8 | 0.895 | 115 | — | 2925 | 540 |
| 5 | 1-decene | 186,400/ 299,500 | 2.5 | — | — | — | — | — | — | — |
| 6 | 1-dodecene | 120,000 | 2.1 | 3.5* | 7.3 | 0.928 | 87 | −102/−14 | 3960 | 100 |
| 7 | 1-dodecene | 118,200 | 4.7 | 3.7 | 13.7 | 0.920 | 109 | — | 10,390 | 704 |
| 8 | 1-dodecene | 112,000 | 2.2 | 11.5 | 10.1 | 0.899 | 92 | −105/−20 | 550 | 539 |
| 9 | 1-dodecene | 139,000 | 2.3 | 19.5 | 10.9 | — | — | —/−30 | — | — |
| 10 | 1-dodecene | 94,000/ 211,000 | 2.0 | 29.4 | 12.6 | <0.86 | −23 | — | — | — |
| 11 | 1-tetradecene | 117,000 | 2.6 | 1.8 | 12.6 | 0.933 | 124 | — | 22,040 | 614 |
| 12 | 1-tetradecene | 121,600 | 2.7 | 4.1 | 10.8 | 0.924 | — | — | 16,490 | 600 |
| 13 | 1-tetradecene | 90,000 | 2.0 | 10.4 | 9.9 | 0.883 | −7 | −102/−11 | — | — |
| 14 | 1-tetradecene | 73,000/ 140,000 | 2.0 | 17.8 | 10.7 | — | −4 | — | — | — |
| 15 | 1-hexadecene | 88,000 | 2.1 | 3.2 | 6.2 | 0.933 | 107 | — | 15,700 | 614 |
| 16 | 1-hexadecene | 100,000 | 2.0 | 4.6 | 8.5 | 0.919 | 88 | −104/−10 | 5581 | 674 |
| 17 | 1-hexadecene | 95,000 | 2.0 | 6.0 | 12.8 | 0.904 | — | −105/−05 | — | 866 |
| 18 | 1-octadecene | 61,000 | 2.1 | 4.8 | 3.6 | 0.940 | 16, 79 | −100/−58 | — | — |
| 19 | 1-octadecene | 84,000 | 2.0 | 5.6 | 6.2 | 0.920 | — | — | — | — |
| 20 | 1-octadecene | 80,000 | 1.9 | 7.2 | 9.4 | 0.893 | 99 | −92/−30 | 135 | 850 |
| 21 | 1-octadecene | 83,000/ 153,000 | 2.0 | 11* | 14.8 | 0.86 | 29 | — | — | — |

[a]First figure from GPC-Differential Refractive Index (DRI) with polyethylene standard; second figure from GPC-viscometer.

Figure 10:
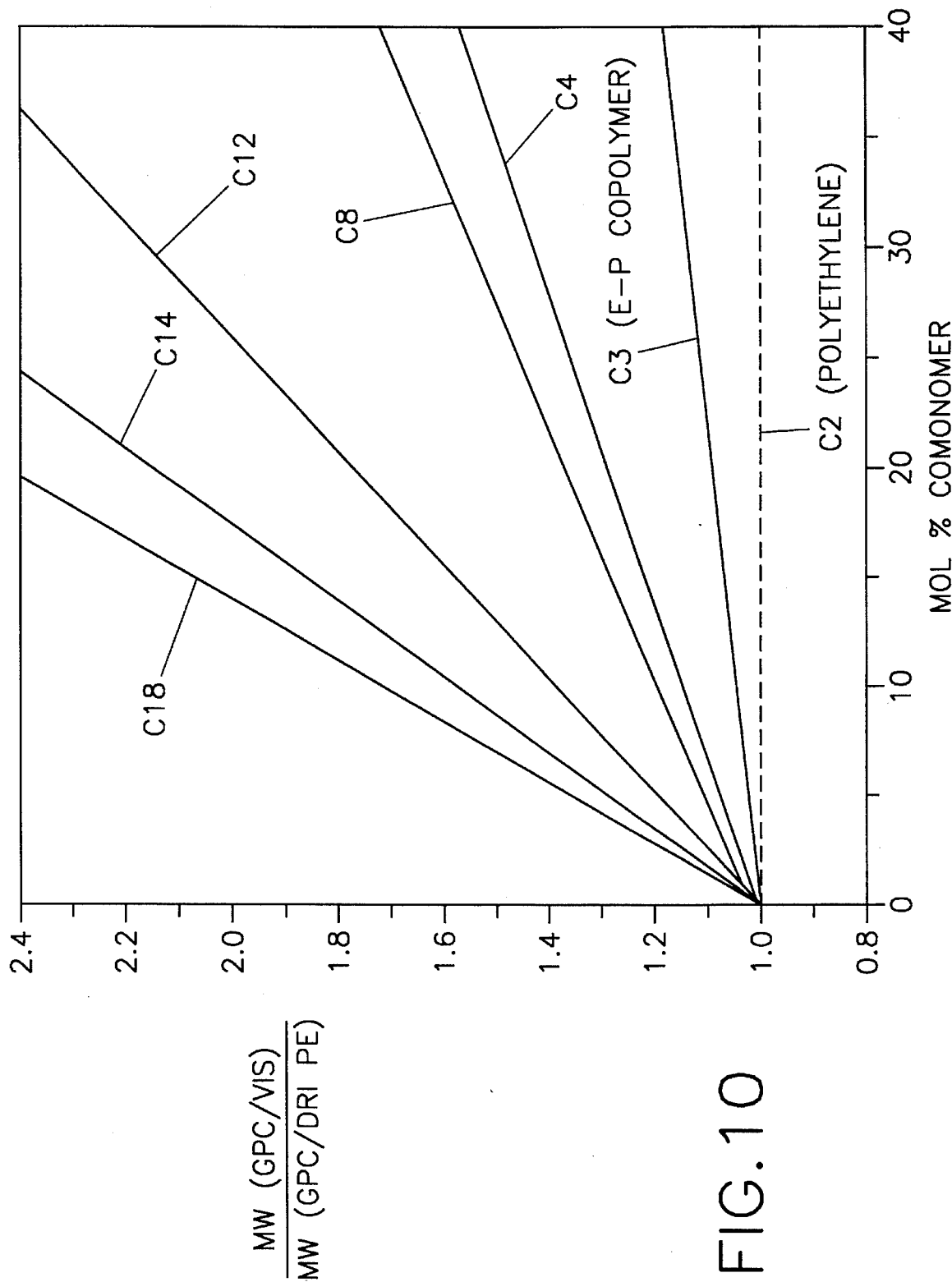
FIG. 10 is a plot showing the deviation in weight average molecular weight ($M_w$) from standard polyethylene calibration curve (ratio of $M_w$ determined by viscometric GPC to $M_w$ determined by GPC differential refractive index (DRI) using a polyethylene calibration curve; $M_w(\text{GPC/VIS})/M_w(\text{GPC/DRI PE})$) versus mole percent comonomer in ethylene/α-olefin copolymers for comonomers propylene, butene-1, hexene-1, dodecene-1, tetradecene-1 and octadecene-1.
Figure 11:
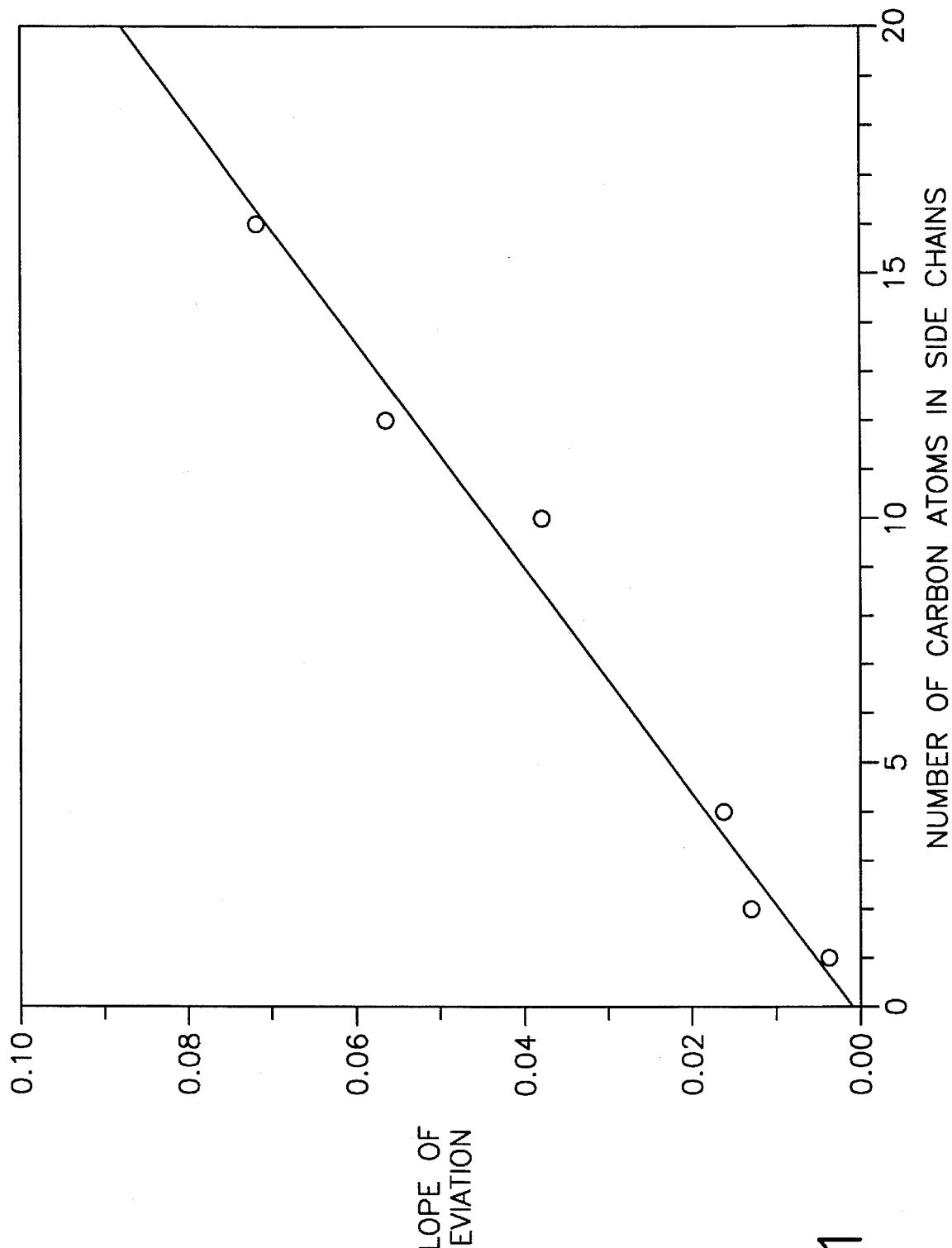
FIG. 11 is a plot of correction factors for converting observed molecular weight into actual molecular weight for the copolymers of the present invention.

The gel permeation chromatography (GPC) data for the present copolymer is very unusual in that the Mw as determined by GPC with differential refractive index (DRI) measurement yielded artificially low results as compared to the more accurate (but more difficult) viscosity (VIS) measurements. This is apparently due to the length of the comonomer side chain distributed throughout the polymer backbone. A comparison of calibration curves for converting GPC/DRI data to GPC/VIS developed from the examples is illustrated in FIGS. 10 and 11 for dodecene, tetradecene and octadecene copolymers. Standard calibration curves included in FIGS. 10 and 11 for polyethylene, ethylene-propylene copolymer, and ethylene-butene and -hexene copolymers, show the comparatively dramatic differences in the GPC calibration curves for the present copolymers.

The melting point data for some of the examples are surprising, particularly those with relatively high comonomer content. In Examples 10, 13, 14, 18 and 21, note the melting points reflect the crystallinity of the side chains, to the exclusion of the backbone or main chain. Where the side chains introduced by the α-olefin comonomer are frequent enough, usually above about 10 mole percent (or less as the length of the comonomer increases), crystallization of the side chains is evidenced in the lower and/or dual melting points.

The stress-strain properties of the copolymers as reported in Table 3 show that the copolymers are extremely soft and tough materials. The modulus of elasticity can vary from extremely low (note Examples 8 and 20) to moderate, and appears to correlate with both comonomer length and content. The strain to break is very unusual in that it is remarkably high. The strain to break of Examples 17 and 20, in excess of 800%, is exceptional.

Figure 8:
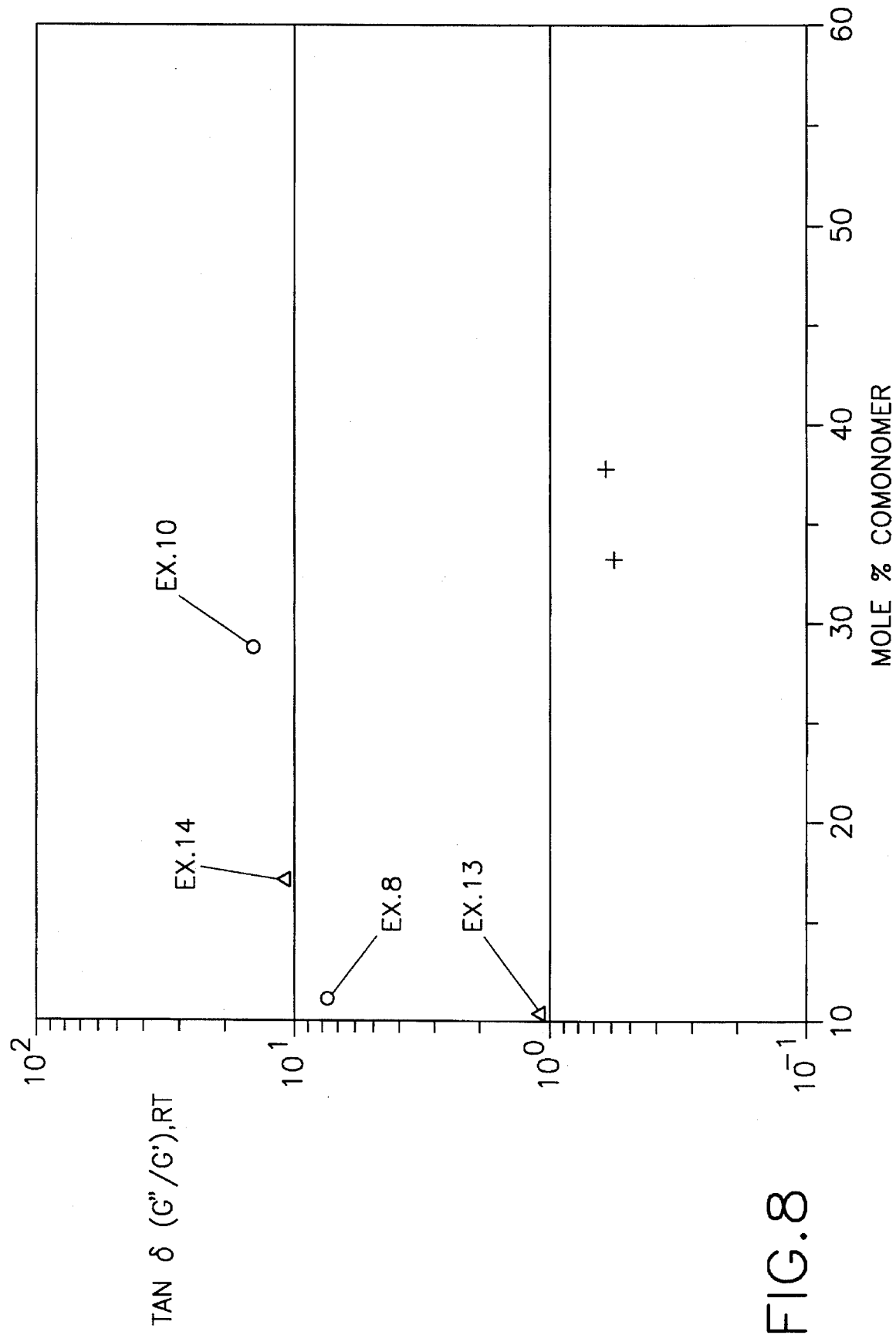
FIG. 8 is a semilog plot of tan δ (10% strain, G" (100 rad/sec)/G'(1 rad/sec)) versus mole percent dodecene (Examples 8 and 10) and tetradecene (Examples 13 and 14) comonomer in the ethylene copolymers of the present invention compared to ethylene/butene copolymers.
Figure 9:
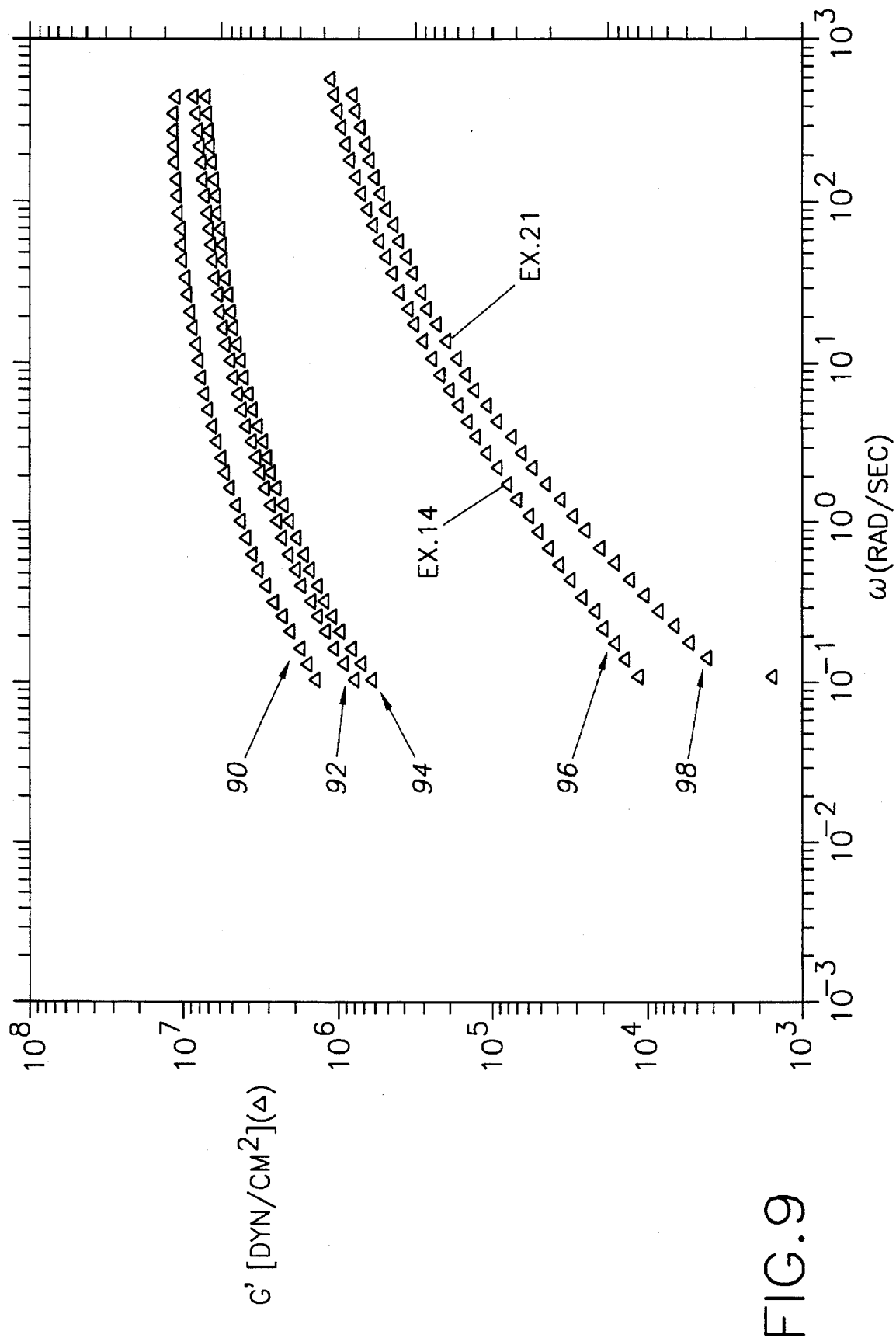
FIG. 9 is a log-log plot of storage modulus (G') versus frequency for an ethylene/tetradecene copolymer (Δ-Δ-Δ) (Example 14) and an ethylene/octadecene copolymer (◊-◊-◊) (Example 21) compared to ethylene/propylene and ethylene/butene copolymers.

The unusual characteristics of the present copolymers are also seen in the storage modulus (G'), loss modulus (G") and tan δ data developed for Examples 5, 9 and 14 presented below in Table 4. The copolymers in general show that they are very lossy, capable of dissipating substantial energy. This property is very desirable in energy absorption and damping applications, for example, in shock absorbers, vibration dampening, etc. Also, the materials show themselves to have good debonding characteristics (G") at high and low frequencies, e.g. they are lossy and compliant, and yet have excellent bonding characteristics (G') at low frequency, for good adhesion performance. See also FIG. 8 which compares tan δ of the present copolymers against ethylene-butene copolymers at varying comonomer contents.

TABLE 4

| POLYMER | STRAIN (%) | TEMP (°C.) | | FREQUENCY (rad/sec) | | | | | | | | | |
|---|---|---|---|---|---|---|---|---|---|---|---|---|---|
| | | | | 0.10 | 0.20 | 0.40 | 1.00 | 2.51 | 10.0 | 39.8 | 100 | 200 | 398 |
| Ex. 9 | 1 | −35° C. | G' (dyne × 10⁵/cm²) | 196 | 197 | 197 | 201 | 204 | 228 | 320 | 423 | 622 | 568 |
| | | | G" (dyne × 10⁵/cm²) | 99.8 | 94.4 | 90.8 | 87.8 | 89.6 | 103 | 138 | 147 | 189 | 161 |
| | | | G"/G' | 0.51 | 0.48 | 0.46 | 0.44 | 0.44 | 0.45 | 0.43 | 0.35 | 0.30 | 0.28 |
| | 10 | −30° C. | G' | 342 | 357 | 373 | 407 | 434 | 489 | 559 | 604 | 662 | 780 |
| | | | G" | 60.2 | 58.1 | 60.8 | 67.7 | 77.7 | 103 | 152 | 196 | 246 | 317 |
| | | | G"/G' | 0.18 | 0.16 | 0.16 | 0.17 | 0.18 | 0.21 | 0.27 | 0.32 | 0.37 | 0.41 |
| | 10 | 00° C. | G' | 73.6 | 78.7 | 83.3 | 90.7 | 96.9 | 107 | 116 | 122 | 127 | 129 |
| | | | G" | 11.9 | 12.4 | 12.4 | 12.1 | 12.2 | 11.5 | 11.9 | 13.2 | 15.0 | 15.6 |
| | | | G"/G' | 0.16 | 0.16 | 0.15 | 0.13 | 0.13 | 0.11 | 0.10 | 0.11 | 0.12 | 0.12 |
| | 10 | 25° C. | G' | 24.9 | 29.2 | 33.3 | 39.6 | 45.4 | 54.2 | 62.3 | 67.2 | 70.7 | 74.5 |
| | | | G" | 8.54 | 9.07 | 9.80 | 10.3 | 10.4 | 10.2 | 9.53 | 9.14 | 8.88 | 8.87 |
| | | | G"/G' | 0.35 | 0.31 | 0.35 | 0.26 | 0.23 | 0.19 | 0.15 | 0.14 | 0.13 | 0.19 |
| | 10 | 45° C. | G' | 6.13 | 8.72 | 11.7 | 16.5 | 22.0 | 30.6 | 38.9 | 43.5 | 46.7 | 48.1 |
| | | | G" | 5.21 | 6.23 | 7.74 | 8.80 | 9.71 | 10.1 | 9.56 | 8.83 | 8.4 | 7.52 |
| | | | G"/G' | 0.85 | 0.72 | 0.64 | 0.53 | 0.44 | 0.33 | 0.25 | 0.20 | 0.18 | 0.16 |
| | 10 | 65° C. | G' | 2.51 | 3.87 | 5.60 | 9.00 | 13.4 | 21.4 | 29.9 | 35.3 | 39.0 | 43.1 |
| | | | G" | 2.81 | 3.84 | 5.02 | 6.74 | 8.31 | 9.88 | 10.2 | 9.90 | 9.38 | 8.97 |
| | | | G"/G' | 1.12 | 0.99 | 0.90 | 0.75 | 0.62 | 0.46 | 0.34 | 0.28 | 0.24 | 0.21 |
| | 10 | 95° C. | G' | 0.517 | 1.14 | 1.94 | 3.62 | 6.23 | 12.2 | 19.9 | 25.1 | 28.8 | 32.2 |
| | | | G" | 1.15 | 1.73 | 2.55 | 3.96 | 5.69 | 8.24 | 9.88 | 10.1 | 10.0 | 9.91 |
| | | | G"/G' | 2.23 | 1.52 | 1.32 | 1.10 | 0.91 | 0.68 | 0.50 | 0.41 | 0.35 | 0.30 |
| Ex. 5 | 0.05 | −120° C. | G' | 40,400 | 41,400 | 42,000 | 42,900 | 43,400 | 44,800 | 46,000 | 43,200 | 174,000 | 675,000 |
| | | | G" | 1250 | 723 | 885 | 916 | 976 | 1200 | 1310 | 1290 | 3820 | 0 |
| | | | G"/G' | 0.03 | 0.02 | 0.02 | 0.02 | 0.02 | 0.03 | 0.03 | 0.03 | 0.02 | 0 |
| | 10 | −30° C. | G' | 59.2 | 62.1 | 66.9 | 71.8 | 75.1 | 79.0 | 91.9 | 108 | 125 | 118 |
| | | | G" | 6.88 | 6.30 | 5.63 | 6.08 | 7.07 | 13.6 | 27.3 | 45.6 | 66.7 | 47.9 |
| | | | G"/G' | 0.12 | 0.10 | 0.09 | 0.08 | 0.09 | 0.17 | 0.30 | 0.42 | 0.33 | 0.41 |
| | 10 | 00° C. | G' | 26.3 | 30.7 | 33.6 | 38.1 | 42.1 | 47.1 | 50.6 | 53.7 | 56.8 | 45.5 |
| | | | G" | 8.06 | 8.39 | 7.98 | 7.37 | 6.90 | 5.54 | 5.63 | 6.35 | 8.53 | 4.95 |
| | | | G"/G' | 0.31 | 0.27 | 0.24 | 0.19 | 0.16 | 0.12 | 0.11 | 0.12 | 0.15 | 0.11 |
| | 10 | 25° C. | G' | 9.60 | 12.7 | 16.1 | 20.9 | 25.9 | 32.5 | 38.1 | 40.7 | 42.8 | 45.2 |
| | | | G" | 6.72 | 7.31 | 8.05 | 8.57 | 8.69 | 8.23 | 7.41 | 6.93 | 6.69 | 6.86 |
| | | | G"/G' | 0.70 | 0.57 | 0.50 | 0.41 | 0.34 | 0.25 | 0.19 | 0.17 | 0.17 | 0.15 |
| | 10 | 45° C. | G' | 4.75 | 6.44 | 0.97 | 13.1 | 17.0 | 25.3 | 32.3 | 36.2 | 36.1 | 42.1 |
| | | | G" | 4.15 | 5.27 | 0.29 | 7.48 | 8.32 | 8.7 | 8.27 | 7.74 | 7.35 | 7.13 |
| | | | G"/G' | 0.87 | 0.82 | 0.70 | 0.57 | 0.47 | 0.34 | 0.26 | 0.21 | 0.19 | 0.17 |
| | 10 | 65° C. | G' | 2.05 | 2.89 | 0.40 | 7.13 | 10.7 | 17.1 | 23.9 | 28.0 | 30.9 | 34.1 |
| | | | G" | 2.28 | 3.12 | 4.10 | 5.47 | 6.70 | 7.90 | 8.09 | 7.76 | 7.43 | 7.18 |
| | | | G"/G' | 1.11 | 1.08 | 0.93 | 0.77 | 0.63 | 0.46 | 0.34 | 0.28 | 0.24 | 0.21 |
| Ex. 14 | 10 | 0° C | G' | 0.607 | 0.959 | 2.54 | 4.08 | 4.08 | 7.19 | 11.1 | 14.0 | 16.1 | 18.6 |
| | | | G" | 0.793 | 1.17 | 2.25 | 3.00 | 4.00 | 4.00 | 4.72 | 5.21 | 5.57 | 5.94 |
| | | | G"/G' | 1.31 | 1.22 | 1.05 | 0.73 | 0.56 | 0.56 | 0.42 | 0.37 | 0.37 | 0.32 |
| | 10 | 23° C. | G' | 0.120 | 0.197 | 0.319 | 0.608 | 1.23 | 2.58 | 5.09 | 7.35 | 9.23 | 11.2 |
| | | | G" | 0.198 | 0.310 | 0.477 | 0.813 | 1.31 | 2.33 | 3.50 | 4.21 | 4.71 | 5.11 |
| | | | G"/G' | 1.65 | 1.57 | 1.50 | 1.34 | 1.16 | 0.90 | 0.69 | 0.57 | 0.51 | 0.45 |

Figure 4:
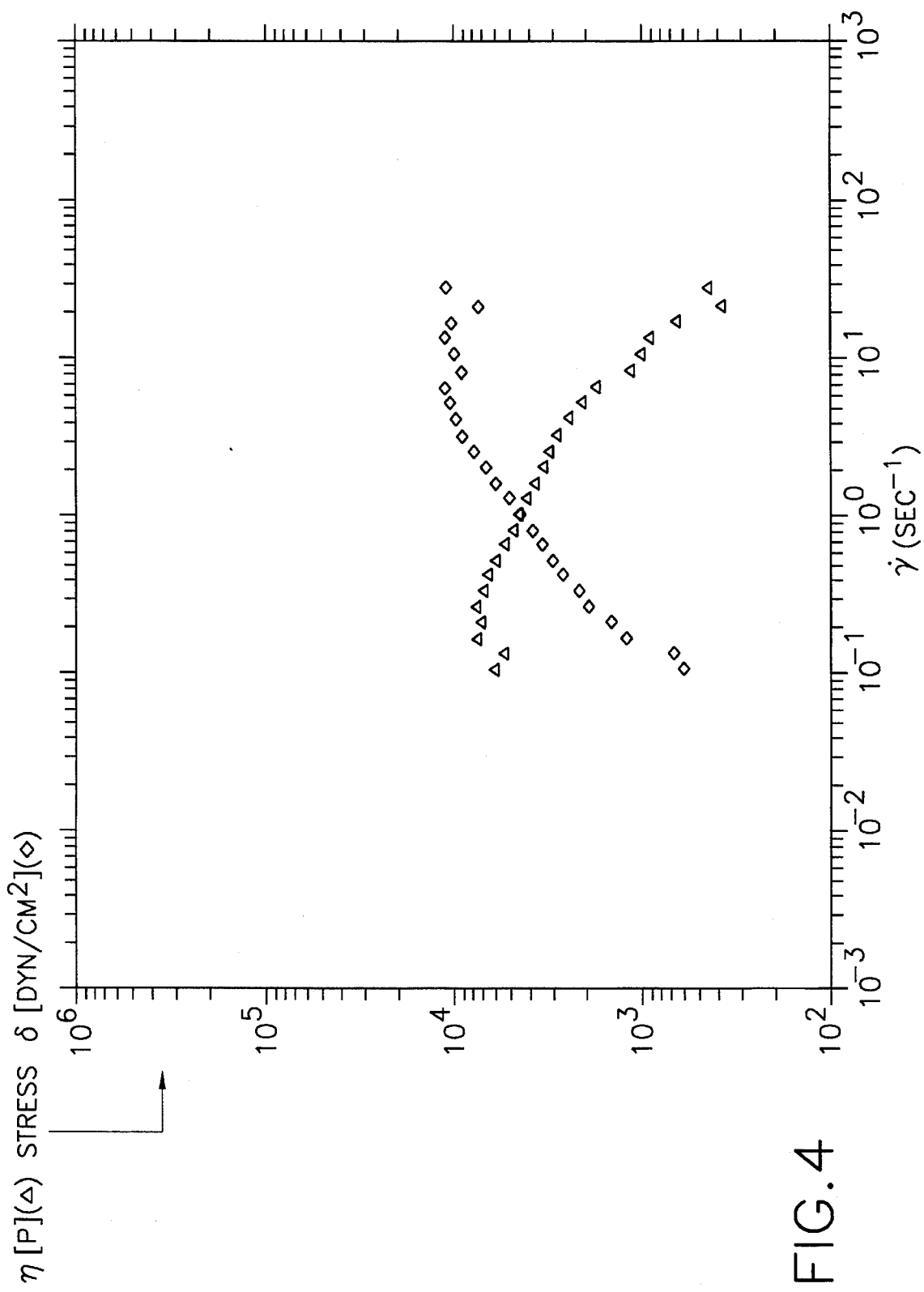
FIG. 4 is a plot of the same material and variables of FIG. 3 at 140° C.
Figure 5:
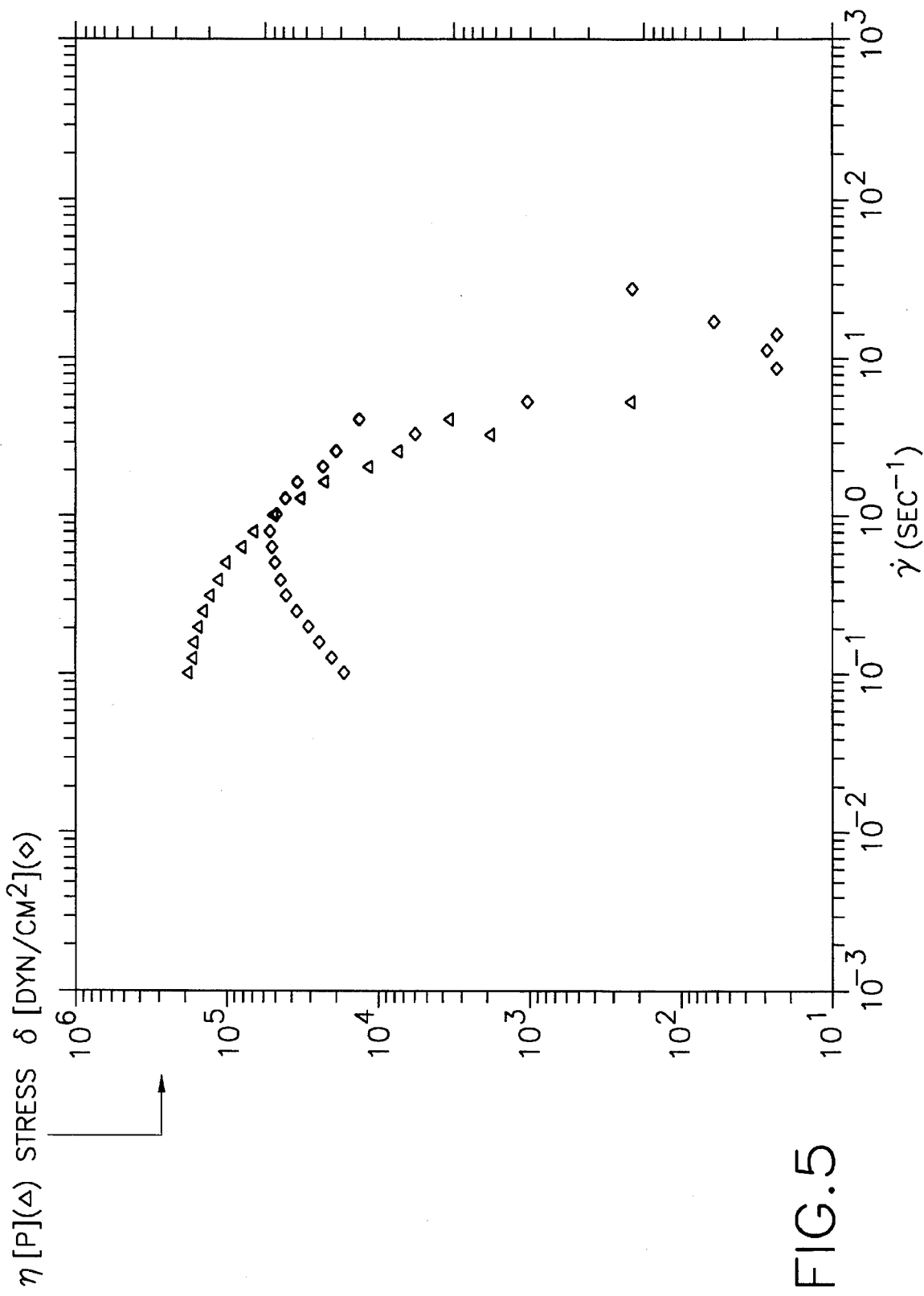
FIG. 5 is a log-log plot of viscosity (Δ-Δ-Δ) and stress (◊-◊-◊) at 25° C. (steady flow) versus frequency for an ethylene/dodecene copolymer (Example 14).
Figure 6:
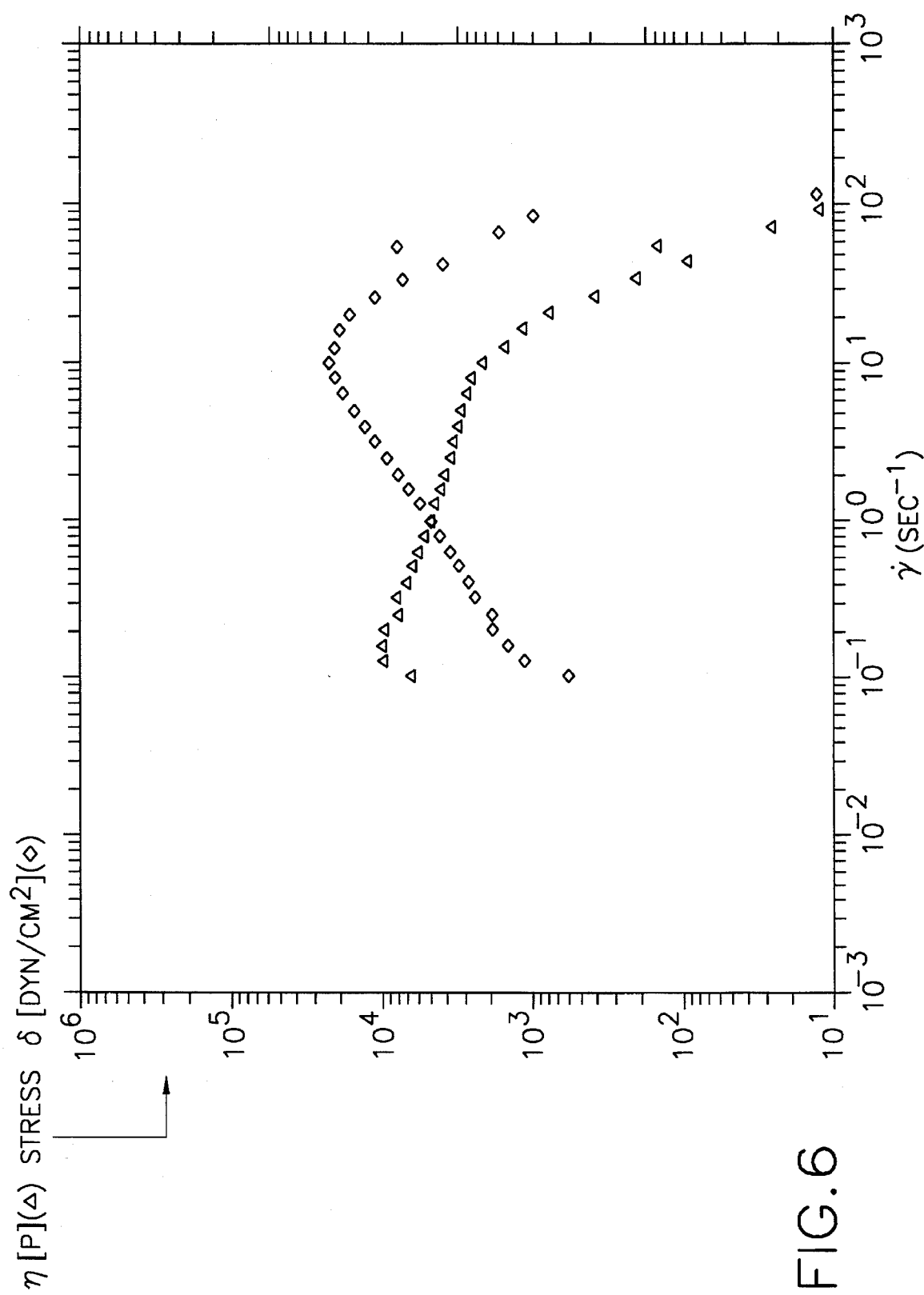
FIG. 6 is the plot of the same material and variables of FIG. 5 at 95° C.
Figure 7:
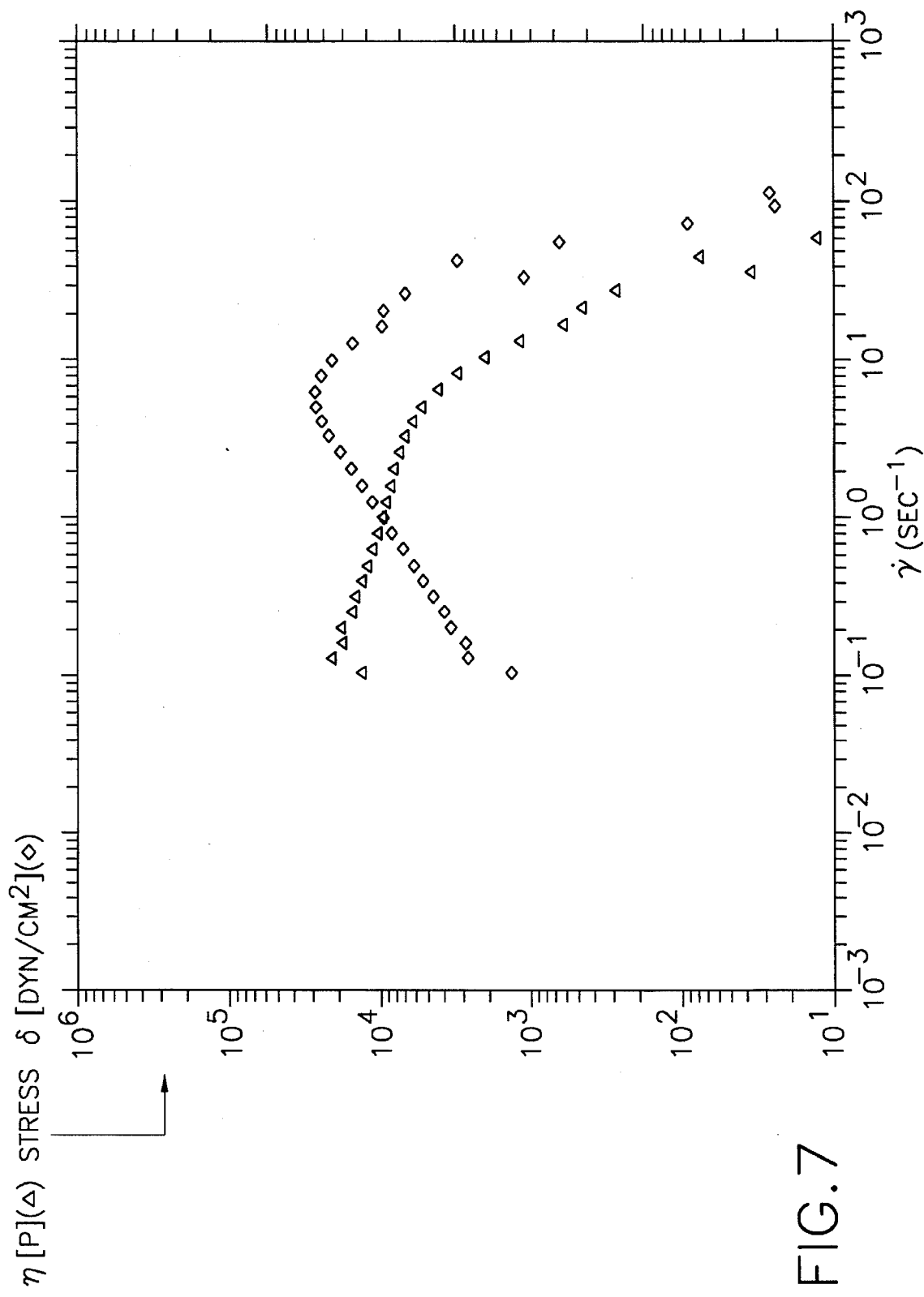
FIG. 7 is the plot of the same material and variables of FIG. 5 at 75° C.

Rheological testing was undertaken for several of the copolymer examples. A relationship of the shear thinning property of the present invention copolymers against comonomer chain length and temperature can be seen in FIGS. 3–7. Shear thinning, as represented by the reduction of viscosity ($\eta$) and stress ($\sigma$) at increasing frequency, is more pronounced for copolymers with shorter comonomer branches ($C_{12}$ versus $C_{18}$ and at a lower temperature). Compare particularly FIG. 4 and FIG. 6.

ADHESIVE FORMULATIONS

Measurements of viscoelastic properties were performed using a PHEOMETRICS SYSTEM IV rheometer or a POLYMER LABORATORIES DMTA rheometer. Isothermal measurements were performed on the SYSTEM IV rheometer over a wide range of temperatures. Isochronal experiments were conducted at a frequency of 10 rad/s and 1 Hz on the SYSTEM IV and the DMTA rheometer, respectively.

Adhesive tests were performed on adhesive compositions dissolved in toluene and then knife-coated to a thickness of about 1.5 mil on a MYLAR substrate. Unless otherwise mentioned, the substrate for the adhesive test was either aluminum, polyethylene or polypropylene.

To prepare a test sample, the adhesive composition was dissolved in toluene and poured inside a hollow-glass cylinder over a piece of stretched cellophane. Films were formed by evaporating the solvent at room temperature. Further drying was conducted in a vacuum oven at 50° C. or at room temperature.

The storage modulus (G') is determined according to a Polymer Laboratories, Inc. dynamic mechanical thermal analyzer (DMTA) procedures at ambient temperature. The PSA is cast in a Teflon-coated mold, and 12 mm diameter disks are die cut for DMTA testing. G' is understood in the art to be a measurement of the elastic or storage modulus (stress/strain) measured in phase with sinusoidal shear displacement of the material.

For T-peel testing, the molten adhesive was poured onto a silicone coated release paper and smoothed to a thickness of about 6 mils by drawing a heated bar across the adhesive layer. The adhesive film, after cooling was peeled from the release paper and bonded between 2 pieces of 5 mil thick aluminum sheets under the bonding conditions of 150° C./40 psi/10 seconds. T-peel strength is defined as the average load per unit width of bondline required to produce progressive separation of 2 bonded adherends. The separation speed was 2 inches/minute.

The shear adhesion failure temperature (SAFT) was measured as the failure temperature of a tape, coated with a 1.5 mil thickness of the adhesive specimen and adhered on a 1"×1" overlap onto a steel substrate, under a 500 g vertical load. This test was conducted in an oven by increasing the oven temperature at the rate of 40° F. per hour.

EXAMPLES 22–23

Adhesive formulations were prepared by solvent blending in toluene the Example 3 (ethylene-$C_{10}$) or Example 17 (ethylene-$C_{16}$) polymer with ESC-5380 tackifier having a hydrogenated cyclic composition ($T_g=36°$ C., $M_w=590$ and $M_w/M_n=1.5$). The formulation was a 60:40 polymer:tackifier weight ratio and either BHT or IRGANOX 1010 was added as a stabilizer (1 wt % based on total adhesive weight).

Adhesive properties are summarized in Table 4. The SAFT is good but the T-Peel results are extraordinary especially for the PE substrate which failed prior to the adhesive bond.

TABLE 5

|  | EXAMPLE 22 | EXAMPLE 23 |
|---|---|---|
| Polymer | Example 3 ($C_2$–$C_{10}$) | Example 17 ($C_2$–$C_{16}$) |
| Density (g/ml) | 0.94 | 0.94 |
| MW | 123,000 | 94,000 |
| MP (°C.) | — | 118 |
| T-PEEL (psi) | | |
| Al | 5.1 | 2.25 |
| PE | 16.2[a] | 13.5[a] |
| PP | 11.3 | 1.9 |
| SAFT[b] (°C.) | | |
| Al | 85 | 133 |
| PE | 94 | 109 |

[a]substrate failure
[b]1" × 1" × 500 g

Figure 2:
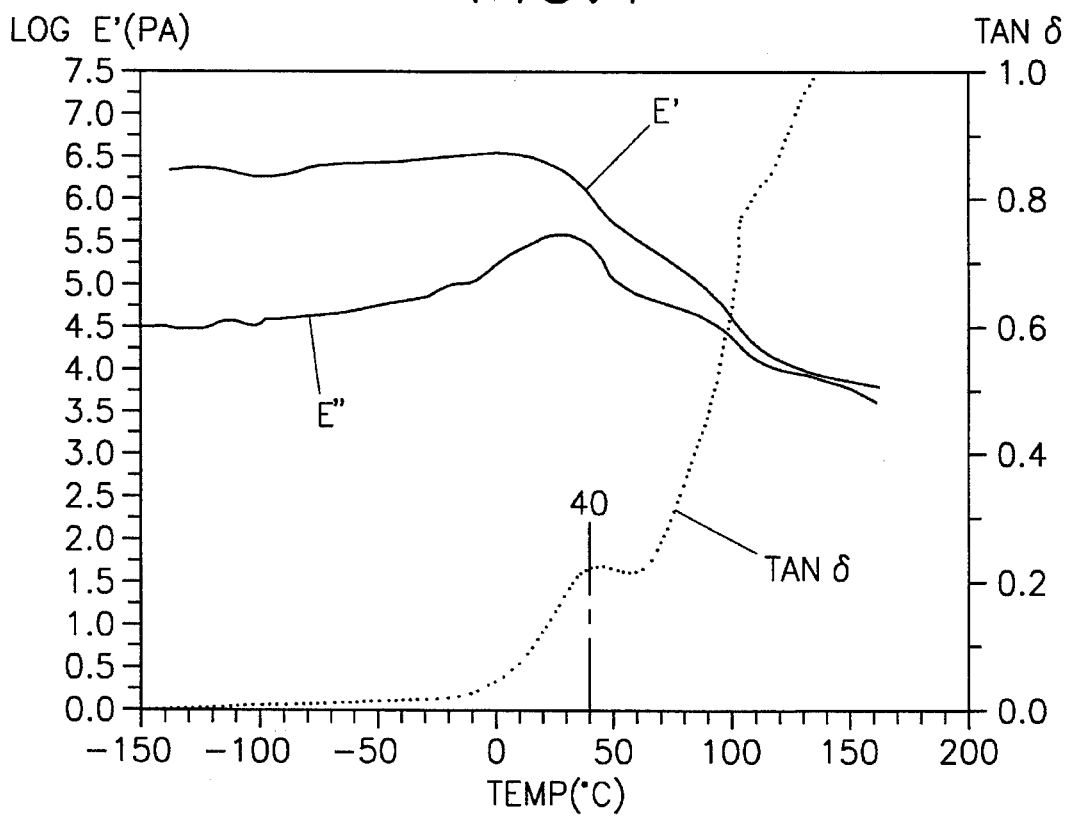
FIG. 2 is a semilog plot of loss tangent versus temperature for an adhesive comprising a 60:40 blend of ethylene/hexadecene copolymer and ESC-1310LC tackifier showing glass transition temperature.
Figure 3:
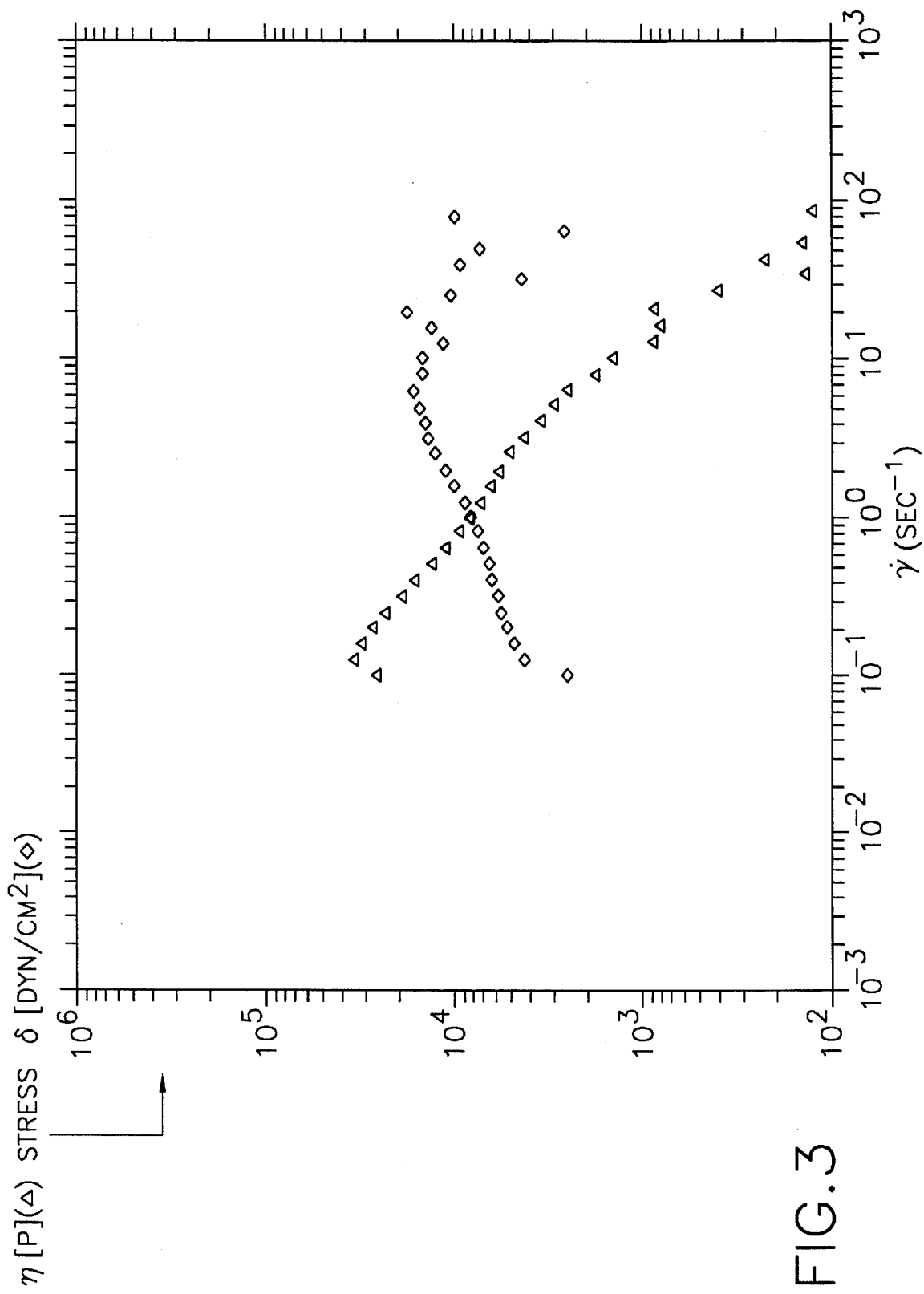
FIG. 3 is a log-log plot of viscosity (Δ-Δ-Δ) and stress (◊-◊-◊) at 75° C. (steady flow) versus frequency for an ethylene/octadecene copolymer (Example 21) of the present invention.

Differential scanning calorimetry analysis of the Example 23 adhesive (FIG. 1) gives a glass transition temperature ($T_g$) of 38.4° C. When the ESC-5380 tackifier was replaced in the adhesive blend with ESC-1310LC tackifier (aliphatic composition, $T_g=40°$ C., $M_w=1500$ and $M_w/M_n=1.3$) maintaining the 60:40 polymer:tackifier composition, the $T_g$ was 43.8° C. (FIG. 2). Many modifications and variations besides the embodiments specifically mentioned may be made in the compositions and methods described herein without substantially departing from the concept of the present invention. Accordingly, it should be clearly understood that the form of the invention described herein is exemplary only, and is not intended as a limitation of the scope thereof.

What is claimed is:

1. A compositionally uniform copolymer of ethylene and 4 to 50 mole percent of a longer α-olefin comonomer of at least 10 to about 30 carbon atoms, wherein said longer α-olefin comonomer is incorporated randomly in the copolymer, said copolymer having a composition distribution breadth index of at least about 70 percent but less than 100 percent, a density from about 0.85 to about 0.95 g/cm$^3$, a weight average molecular weight from about 30,000 to about 1,000,000 daltons, and a molecular weight distribution from about 2 to about 4.

2. The copolymer of claim 1, wherein the α-olefin comonomer is straight-chained.

3. The copolymer of claim 1, wherein the α-olefin comonomer has from 12 to 30 carbon atoms.

4. The copolymer of claim 1, comprising about from 5.6 to about 30 mole % of the α-olefin comonomer.

5. The copolymer of claim 1, comprising from about 4 to about 30 mole percent of the α-olefin.

6. An amorphous copolymer of claim 1, comprising at least about 12 mole percent of the α-olefin comonomer and having a density from about 0.85 to about 0.90 g/cm$^3$.

7. A semicrystalline copolymer of claim 1, comprising up to about 12 mole percent of the α-olefin comonomer and having a density above about 0.88 g/cm$^3$.

8. The copolymer of claim 1, wherein the molecular weight is from about 80,000 to about 500,000 daltons.

9. The copolymer of claim 1 having a composition distribution breadth index of at least about 80% but less than 100%.

10. A film, comprising a semicrystalline copolymer of ethylene and of 4 to 50 mole percent of a longer α-olefin comonomer of at least 10 to about 30 carbon atoms wherein said longer α-olefin comonomer is uniformly incorporated randomly in said copolymer, said copolymer having a composition distribution breadth index of at least 70 percent but less than 100 percent, a density from about 0.88 to about 0.93 g/cm$^3$, a weight average molecular weight from about 80,000 to about 500,000 daltons, and a molecular weight distribution from about 2 to about 4.

11. A compositionally uniform copolymer of ethylene and of 10 to 50 mole percent of an α-olefin comonomer of at least 10 to about 30 carbon atoms uniformly incorporated randomly in the copolymer, said copolymer having a composition distribution breadth index of at least about 70%, but less than 100%, a density from about 0.85 to about 0.95 g/cm$^3$, a weight average molecular weight from about 80,000 to about 1,000,000 daltons, and a molecular weight distribution from about 2 to about 4.

12. The copolymer of claim 11 having an Mw of about 150,000 to about 1,000,000.

* * * * *